United States Patent
Chen et al.

(10) Patent No.: US 10,461,975 B2
(45) Date of Patent: Oct. 29, 2019

(54) DYNAMIC CYCLIC PREFIX (CP) LENGTH IN WIRELESS COMMUNICATION

(71) Applicant: QUALCOMM Incorporated, San Diego, CA (US)

(72) Inventors: Wanshi Chen, San Diego, CA (US); Peter Gaal, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 15/288,884

(22) Filed: Oct. 7, 2016

(65) Prior Publication Data

US 2017/0331658 A1    Nov. 16, 2017

Related U.S. Application Data

(60) Provisional application No. 62/334,566, filed on May 11, 2016.

(51) Int. Cl.
*H04L 12/801* (2013.01)
*H04L 12/24* (2006.01)
(Continued)

(52) U.S. Cl.
CPC ............ *H04L 27/2607* (2013.01); *H04L 5/22* (2013.01); *H04W 72/1263* (2013.01); *H04W 72/1278* (2013.01)

(58) Field of Classification Search
CPC ... H04L 27/2607; H04L 7/0016; H04W 72/12
See application file for complete search history.

(56) References Cited

U.S. PATENT DOCUMENTS 8,422,577 B1    4/2013    Shetty et al.
9,331,827 B2    5/2016    Siomina et al.
(Continued)

FOREIGN PATENT DOCUMENTS

WO    WO2009052420    *    4/2009    ............... H04L 5/14
WO    WO-2009052420         4/2009
WO    WO-2010050731 A2    5/2010

OTHER PUBLICATIONS

3GPP TSG RAN WG1 Meeting #78, R1-143126, Pub.date: Aug. 18-20, 2014.*

(Continued)

*Primary Examiner* — Brian S Roberts
*Assistant Examiner* — Abusayeed M Haque
(74) *Attorney, Agent, or Firm* — Loza & Loza, LLP

(57) ABSTRACT

An apparatus may determine a cyclic prefix (CP) length for a signal for a communication link based on a dynamic indication. The CP length may be determined from a plurality of CP lengths. The apparatus may communicate the signal using the determined CP length. Determining the CP length may be further based on at least one of a modulation and coding scheme, a subcarrier spacing, a service type, a communication link direction, a rank number, a type or a capability of the node, or a number of nodes scheduled in the same transmit time interval. Determining the CP length may include determining a first CP length for a first symbol of a plurality of symbols in the TTI, and determining a second CP length, different than the first CP length, for a second symbol of the plurality of symbols in the TTI. Various additional and alternative aspects are described herein.

30 Claims, 15 Drawing Sheets

(51) Int. Cl.
*H04L 5/14* (2006.01)
*H04L 27/26* (2006.01)
*H04L 5/22* (2006.01)
*H04W 72/12* (2009.01)

(56) References Cited

U.S. PATENT DOCUMENTS

| | | | | |
|---|---|---|---|---|
| 2008/0247480 | A1* | 10/2008 | Ionescu | H04J 11/0066 |
| | | | | 375/260 |
| 2009/0011785 | A1* | 1/2009 | Celebi | H04W 52/50 |
| | | | | 455/522 |
| 2009/0028258 | A1* | 1/2009 | Ma | H04L 27/2602 |
| | | | | 375/260 |
| 2009/0296645 | A1* | 12/2009 | Bui | H04L 5/0007 |
| | | | | 370/329 |
| 2010/0118800 | A1* | 5/2010 | Kim | H04L 1/0071 |
| | | | | 370/329 |
| 2010/0303166 | A1* | 12/2010 | Piedras | H04L 27/2607 |
| | | | | 375/267 |
| 2010/0319033 | A1* | 12/2010 | Auranen | H04N 21/2385 |
| | | | | 725/62 |
| 2011/0002412 | A1* | 1/2011 | Hou | H04B 7/0413 |
| | | | | 375/267 |
| 2013/0003668 | A1* | 1/2013 | Xiao | H04L 5/001 |
| | | | | 370/329 |
| 2013/0315321 | A1 | 11/2013 | Rajagopal et al. | |
| 2014/0112274 | A1* | 4/2014 | Moon | H04L 5/0007 |
| | | | | 370/329 |
| 2016/0043830 | A1* | 2/2016 | Simon | H04L 5/0007 |
| | | | | 375/295 |
| 2016/0043890 | A1* | 2/2016 | Simon | H04L 27/2649 |
| | | | | 375/260 |
| 2017/0311217 | A1* | 10/2017 | Jung | H04W 36/04 |

OTHER PUBLICATIONS

3GPP TSG RAN WG1 Meeting #78bits, R1-144070, Pub.date: Oct. 6-10, 2014.*
3GPP TSG RAN WG1 Meeting #84bits, R1-144070, Pub.date: Apr. 11-15, 2016.*
Zhang Z-Y., et al., "A Novel OFDM Transmission Scheme with Length-Adaptive Cyclic Prefix", Journal of Zhejiang University Science, vol. 5, No. 11, 2004, pp. 1336-1342.
Huawei., et al., "Overview of 5G frame structure," 3rd Generation Partnership Project (3GPP); 3GPP DRAFT; R1-162157, Mobile Competence Centre ; 650, Route Des Lucioles ; F-06921 Sophia-Antipolis Cedex; France; vol. RAN WG1, No. Busan, Korea; Apr. 11, 2016-Apr. 15, 2016; Apr. 2, 2016 (Apr. 2, 2016), XP051080003, pp. 6. Retrieved from the Internet: URL: http://www.3gpp.org/ftp/tsg_ran/WG1_RL1/TSGR1_84b/Docs/ [retrieved on Apr. 2, 2016].
International Search Report and Written Opinion—PCT/US2017/031443—ISA/EPO—dated Aug. 10, 2017.
Lucent A., et al., "Configuration of D2D CP Length," 3rd Generation Partnership Project (3GPP); 3GPP Draft; R1-144070 Ra D2dcp Final, Mobile Competence Centre ; 650, Route Des Lucioles; F-06921; Sophia-Antipolis Cedex; France; vol. RAN WG1, No. Ljubljana, Slovenia; Oct. 6, 2014-Oct. 10, 2014; Sep. 27, 2014 (Sep. 27, 2014), XP050869728, pp. 2. Retrieved from the Internet: URL:http://www.3gpp.org/ftp/tsg_ran/WG1_RL1/TSGR1_78b/Docs/ [retrieved on Sep. 27, 2014].
SHARP: "Consideration on Configurable CP Length for D2D Transmission ," 3rd Generation Partnership Project (3GPP), Mobile Competence Centre, 3GPP Draft; R1-143126, 650, Route Des Lucioles; F-06921 Sophia-Antipolis Cedex ; France; vol. RAN WG1, No. Dresden, Germany; Aug. 18, 2014-Aug. 22, 2014; Aug. 17, 2014 (Aug. 17, 2014), XP050788604, pp. 4. Retrieved from the Internet: URL:http://www.3gpp.org/ftp/Meetings_3GPP_SYNC/RAN1/Docs/ [retrieved on Aug. 17, 2014].

* cited by examiner

DYNAMIC CYCLIC PREFIX (CP) LENGTH IN WIRELESS COMMUNICATION

PRIORITY CLAIM

This application claims priority to and the benefit of provisional patent application no. 62/334,566 filed in the United States Patent and Trademark Office on 11 May 2016, the entire content of which is incorporated herein by reference as if fully set forth below in its entirety and for all applicable purposes.

TECHNICAL FIELD

The technology discussed herein relates, generally, to wireless communication systems, and, more particularly, to using a dynamic cyclic prefix (CP) length for wireless communication.

INTRODUCTION

Wireless communication networks are widely deployed to provide various communication services such as telephony, video, data, messaging, broadcasts, and so on. Such networks, which are usually multiple access networks, support communication for multiple users by sharing the available network resources. Within such wireless networks, a variety of data services may be provided, including voice, video, messaging, and emails. The spectrum allocated to such wireless communication networks can include licensed spectrum and/or unlicensed spectrum. As the demand for mobile broadband access continues to increase, research and development continue to advance wireless communication technologies not only to meet the growing demand for mobile broadband access, but also to advance and enhance the user experience with mobile communications.

In an ideal case without any multipath, a wireless communication network that utilized orthogonal frequency division multiplexing (OFDM) would be able to transmit signals that were free from any interference from other subcarriers or tones, and from inter-symbol interference (ISI). However, in a real-world network having a multipath radio environment, orthogonality between the subcarriers may be partially lost. To help maintain orthogonality, many networks that utilize OFDM may sometimes utilize a cyclic prefix (CP) to mitigate the ISI from multipath communication. In some examples, a network may implement a CP by copying the tail of each OFDM symbol and pasting it onto the front of the symbol.

Some systems may use a longer CP duration in a scenario where there is greater delay spread, particularly for wireless devices found near the outer boundary of a relatively large cell. However, the use of a longer CP duration may result in increased overhead and lower resource utilization. On the other hand, a CP length that is too short may not adequately mitigate the potential impact of ISI. Accordingly, the appropriate CP length may be different under varying circumstances.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide various methods and apparatuses configured to dynamically determine a CP length and/or tone spacing collaboratively between nodes (e.g., a scheduling entity and a subordinate entity) based on various factors observed by the nodes.

One aspect of the present disclosure provides a method of wireless communication by a node. The method determines at least one of a cyclic prefix (CP) length or a tone spacing for a signal for a communication link based on a dynamic indication. The CP length is determined from a plurality of CP lengths, and the tone spacing is determined from a plurality of tone spacings. The method further communicates the signal utilizing the determined at least one of the CP length or the tone spacing.

Another aspect of the present disclosure provides an apparatus for wireless communication. The apparatus includes a communication interface configured to utilize a signal for a communication link, a memory stored with executable code, and a processor operatively coupled to the communication interface and memory. The processor is configured by the executable code to determine at least one of a CP length or a tone spacing for a signal for a communication link based on a dynamic indication. The CP length is determined from a plurality of CP lengths, and the tone spacing is determined from a plurality of tone spacings. The processor is further configured to communicate the signal utilizing the determined at least one of the CP length or the tone spacing.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In some aspects of the disclosure, a cyclic prefix (CP) length or CP duration may be dynamically determined to increase communication efficiency and/or reduce overhead. Aspects of the disclosure provide various methods and apparatuses configured to dynamically determine a CP length and/or tone spacing collaboratively between a scheduling entity and a subordinate entity based on various factors observed by the scheduling entity and/or subordinate entity.

Figure 1:
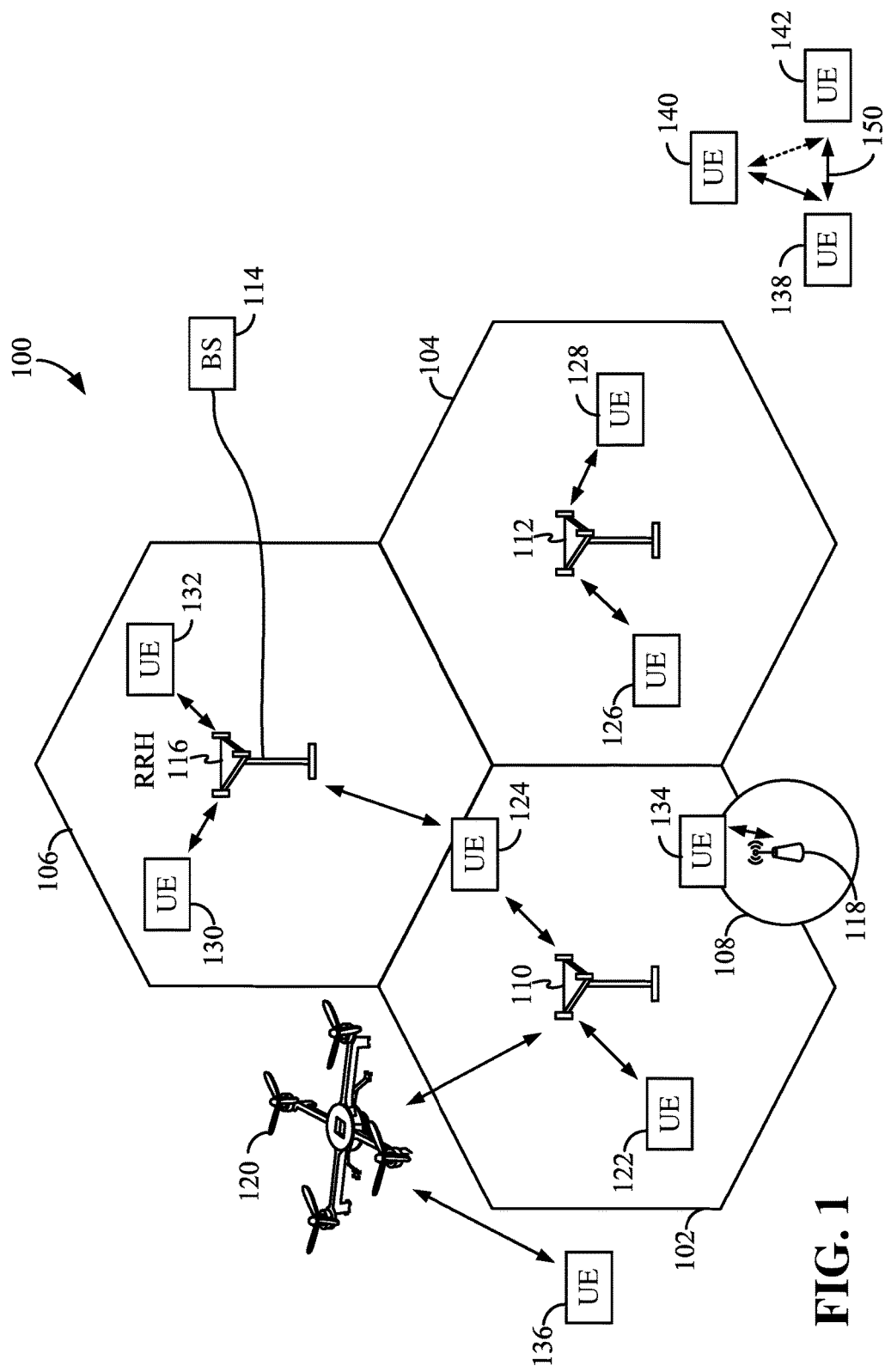
FIG. 1 is a diagram illustrating an example of an access network according to some aspects of the present disclosure.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided. The geographic region covered by the access network 100 may be divided into a number of cellular regions (cells), including macro-cells 102, 104, and 106, and a small cell 108, each of which may include one or more sectors. Cells may be defined geographically (e.g., by coverage area) and/or may be defined in accordance with a frequency, scrambling code, etc. In a cell that is divided into sectors, the multiple sectors within a cell can be formed by groups of antennas with each antenna responsible for communication with mobile devices in a portion of the cell.

In general, a radio transceiver apparatus serves each cell. A radio transceiver apparatus is commonly referred to as a base station (BS) in many wireless communication systems, but may also be referred to by those skilled in the art as a base transceiver station (BTS), a radio base station, a radio transceiver, a transceiver function, a basic service set (BSS), an extended service set (ESS), an access point (AP), a Node B, an eNode B, or some other suitable terminology.

In FIG. 1, two high-power base stations 110 and 112 are shown in cells 102 and 104; and a third high-power base station 114 is shown controlling a remote radio head (RRH) 116 in cell 106. In this example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120. In some examples, the base stations may be interconnected to one another and/or to one or more other base stations or network nodes (not shown) in the access network 100 through various types of backhaul interfaces such as a direct physical connection, a virtual network, or the like using any suitable transport network.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Within the present document, a "mobile" apparatus need not necessarily have a capability to move, and may be stationary. Some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells. In another example, the quadcopter 120 may be configured to function as a UE. For example, the quadcopter 120 may operate within cell 102 by communicating with base station 110.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), sparse code multiple access (SMA), code division multiple access (CDMA), frequency division multiple access (FDMA), orthogonal frequency division multiple access (OFDMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), SMA, or other suitable multiplexing schemes.

Within the access network 100, during a call with a scheduling entity, or at any other time, a UE may monitor various parameters of the signal from its serving cell as well as various parameters of neighboring cells. Further, depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). For example, UE 138 is illustrated communicating with UEs 140 and 142. In this example, the UE 138 is functioning as a scheduling entity, and UEs 140 and 142 utilize resources scheduled by the UE 138 for wireless communication. A UE may function as a scheduling entity in a peer-to-peer (P2P) network, and/or in a mesh network. In a mesh network example, UEs 140 and 142 may optionally communicate directly with one another in addition to communicating with the scheduling entity 138.

Figure 2:
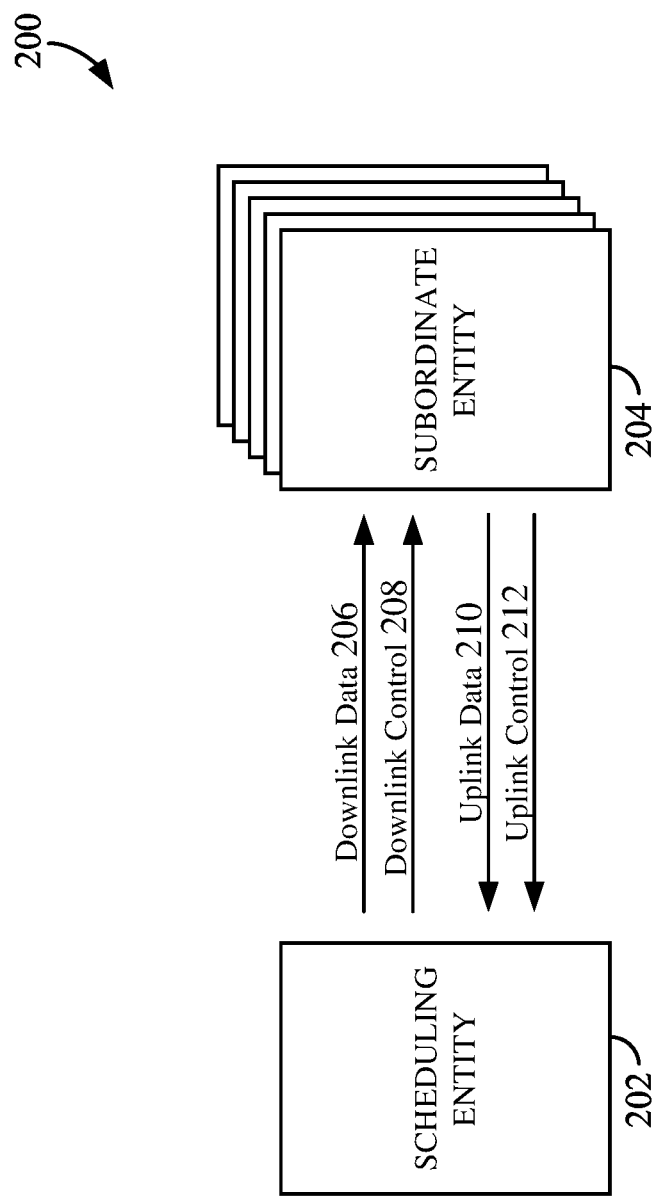
FIG. 2 is a diagram conceptually illustrating an example of a scheduling entity communicating with one or more subordinate entities according to some aspects of the present disclosure.

Thus, in a wireless communication network with a scheduled access to time-frequency resources and having a cellular configuration, a P2P configuration, and a mesh configuration, a scheduling entity and one or more subordinate entities may communicate utilizing the scheduled resources. Referring now to FIG. 2, a block diagram 200 illustrates a scheduling entity 202 and a plurality of subordinate entities 204. Here, the scheduling entity 202 may correspond to the base stations 110, 112, 114, and 118. In additional examples, the scheduling entity 202 may correspond to the UE 138, the quadcopter 120, or any other suitable node in the access network 100. Similarly, in various examples, the subordinate entity 204 may correspond to the UE 122, 124, 126, 128, 130, 132, 134, 136, 138, 140, and 142, or any other suitable node in the access network 100.

As illustrated in FIG. 2, the scheduling entity 202 may broadcast data 206 to one or more subordinate entities 204 (the data may be referred to as downlink data). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more subordinate entities to the scheduling entity 202. Another way to describe the system may be to use the term broadcast channel multiplexing. In accordance with aspects of the present disclosure, the term uplink may refer to a point-to-point transmission originating at a subordinate entity 204. Broadly, the subordinate entity 204 is a node or device that receives scheduling control information, including but not limited to scheduling grants, synchronization or timing information, or other control information from another entity in the wireless communication network such as the scheduling entity 202.

The scheduling entity 202 may broadcast a control channel 208 to one or more subordinate entities 204. Uplink data 210 and/or downlink data 206 may be transmitted using a transmission time interval (TTI). Here, a TTI may correspond to an encapsulated set or packet of information capable of being independently decoded. In various examples, TTIs may correspond to frames, subframes, data blocks, time slots, or other suitable groupings of bits for transmission.

Furthermore, the subordinate entities 204 may transmit uplink control information 212 to the scheduling entity 202. Uplink control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit in the downlink control channel 208 information that may schedule the TTI for uplink packets. In a further example, the uplink control channel 212 may include hybrid automatic repeat request (HARQ) feedback transmissions, such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc. The channels illustrated in FIG. 2 are not necessarily all of the channels that may be utilized between a scheduling entity 202 and subordinate entities 204, and those of ordinary skill in the art will recognize that other channels may be utilized in addition to those illustrated, such as other data, control, and feedback channels.

In various aspects of the disclosure, any one or more of the downlink data channels 206, downlink control channels 208, uplink data channels 210, and/or uplink control channels 212 may be transmitted utilizing OFDM. In this case, the transmission may utilize a CP in its transmission symbols to help maintain orthogonality between subcarriers and to help reduce inter-symbol interference. In some aspects of the disclosure, the scheduling entity 202 may transmit a dynamic indication or information regarding CP length or CP duration to the subordinate entities 204. The information may be transmitted using the downlink control channel 208 or other channels. In some examples, the scheduling entity 202 may indicate one or more recommended CP lengths to be used for the communication between the scheduling entity 202 and the subordinate entities 204. The same or different CP lengths may be used for different subordinate entities 204. The subordinate entity 204 may assist the scheduling entity 202 in selecting the CP length. In some examples, the subordinate entity 204 may select one or more CP lengths recommended by the scheduling entity 202. In some examples, the subordinate entity 204 may recommend a CP length that is different from the CP lengths provided by the scheduling entity. In some examples, the subordinate entity 204 may not receive any recommended CP lengths from the scheduling entity.

Figure 3:
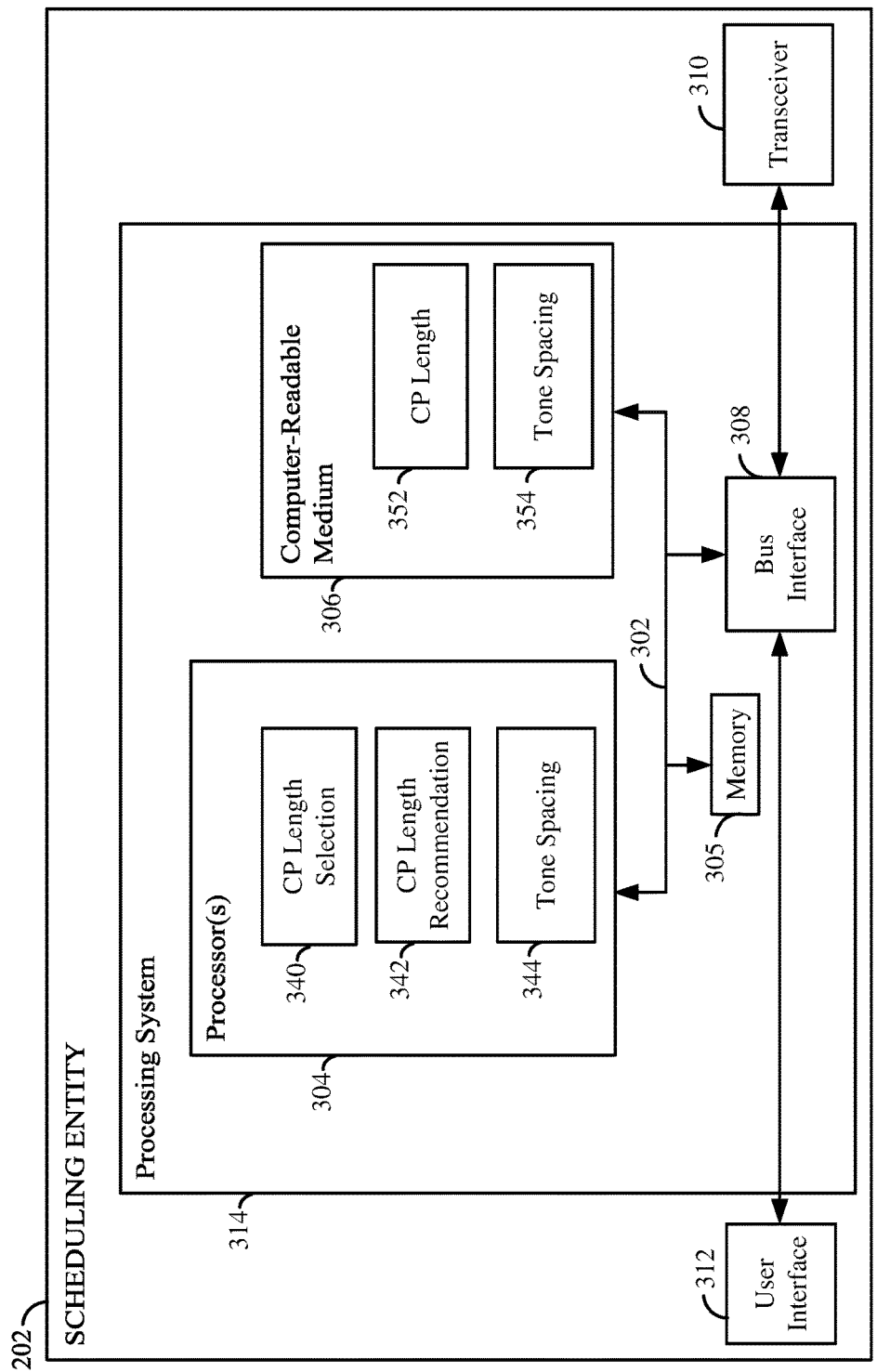
FIG. 3 is a diagram illustrating an example of a hardware implementation for a scheduling entity according to some aspects of the present disclosure.

FIG. 3 is a diagram illustrating an example of a hardware implementation for a scheduling entity 202 according to aspects of the present disclosure. The scheduling entity 202 may employ a processing system. For example, the scheduling entity 202 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 202 may be configured to perform any one or more of the functions described herein. That is, the processor 304, as utilized in the scheduling entity 202, may be used to implement any one or more of the processes or methods described herein, for example, in FIGS. 7-14.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits. A bus interface 308 provides an interface between the bus 302 and a transceiver 310. The transceiver 310 provides a communication interface or means for communicating with various other apparatus over a transmission medium. Depending upon the nature of the apparatus, a user interface 312 (e.g., keypad, display, speaker, microphone, joystick) may also be provided.

At least one processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software. In some aspects of the disclosure, the computer-readable medium 306 may include communication instructions 352. The communication instructions 352 may include instructions for performing various operations related to wireless communication (e.g., signal reception and/or signal transmission) as described herein. In some aspects of the disclosure, the computer-readable medium 306 may include processing instructions 354. The processing instructions 354 may include instructions for performing various operations related to signal processing (e.g., processing a received signal and/or processing a signal for transmission) as described herein.

At least one processor 304 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, at least one processor 304 may include a communication circuit (not shown). The communication circuit may include one or more hardware components that provide the physical structure that performs various processes related to wireless communication (e.g., signal reception and/or signal transmission) as described herein. In some aspects of the disclosure, the processor 304 may also include a processing circuit. The processing circuit may include one or more hardware components that provide the physical structure that performs various processes related to signal processing (e.g., processing a received signal and/or processing a signal for transmission) as described herein.

In some aspects of the disclosure, the processor 304 may include a CP length selection block 340, a CP length recommendation block 342, and a tone spacing block 344. The CP length selection block 340 may be configured to process and transmit a CP length proposal to a subordinate entity via the transceiver 310. The CP length proposal may include one or more CP lengths that may be used with a signal to communicate with the subordinate entity as described in relation to FIGS. 7-14. The CP length recommendation block 342 may be configured to receive and process a recommended CP length received from a subordinate entity. The recommended CP length may include one or more CP lengths that may be the same or different from those provided by the CP length proposal.

The tone spacing block 344 may be configured to transmit information indicating one or more tone spacings (recommended tone spacing) to a subordinate entity. The tone spacing block 344 may also be configured to receive information indicating a recommended tone spacing via the transceiver 310 from the subordinate entity. Here, the subordinate entity may determine the recommended tone spacing based on various factors as described in relation to FIG. 13. The tone spacing block 344 may also be configured to determine a tone spacing of a signal for communication with the subordinate entity. The determined tone spacing may be the same or different from the tone spacing recommended by the subordinate entity.

The circuitry included in the processor 304 is provided as non-limiting examples. Other means for carrying out the described functions exists and is included within various aspects of the present disclosure. In some aspects of the disclosure, the computer-readable medium 306 may store computer-executable code comprising instructions configured to perform various processes described herein, for example, in relation to FIGS. 7-14. The instructions included in the computer-readable medium 306 are provided as non-limiting examples. Other instructions configured to carry out the described functions exist and are included within various aspects of the present disclosure.

In some aspects of the disclosure, the computer-readable medium 306 may store CP length code 352 and tone spacing code 354. The CP length code 352, when executed, may configure the processor 304 to perform the various processes and/or methods related to CP length described in relation to FIGS. 7-14. The tone spacing code 354, when executed, may configure the processor 304 to perform the various processes and/or methods related to tone spacing described in relation to FIG. 13.

Figure 4:
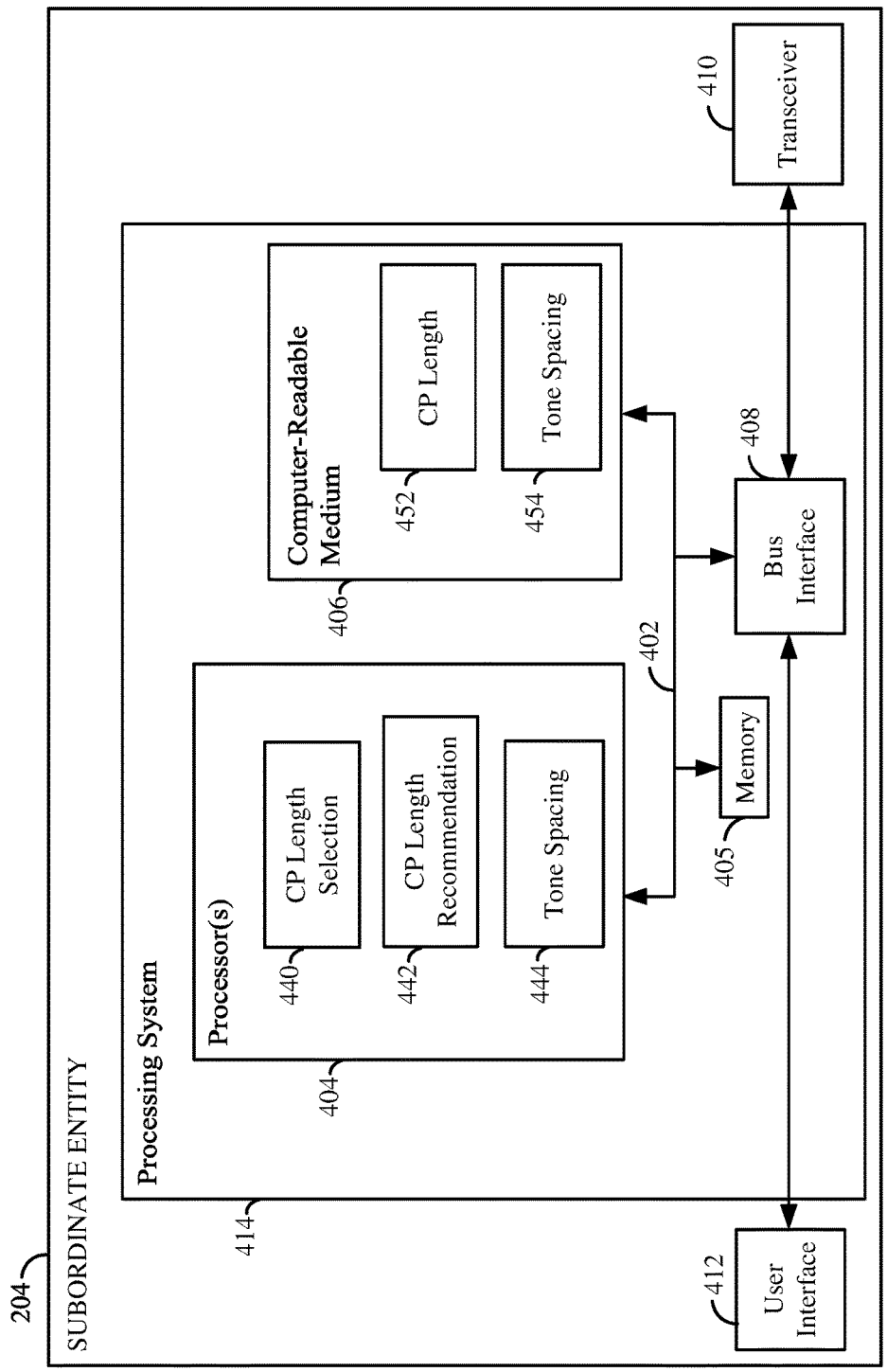
FIG. 4 is a diagram illustrating an example of a hardware implementation for a subordinate entity according to some aspects of the present disclosure.

FIG. 4 is a diagram illustrating an example of a hardware implementation for a subordinate entity 204 according to aspects of the present disclosure. The subordinate entity 204 may employ a processing system. The subordinate entity 204 may be implemented with a processing system 414 that includes one or more processors 404. Examples of processors 404 include microprocessors, microcontrollers, DSPs, FPGAs, PLDs, state machines, gated logic, discrete hardware circuits, and other suitable hardware configured to perform the various functionality described throughout this disclosure. In various examples, subordinate entity 204 may be configured to perform any one or more of the functions described herein. That is, the processor 404, as utilized in subordinate entity 204, may be used to implement any one or more of the processes described herein, for example, in FIGS. 7-14.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits. A bus interface 408 provides an interface between the bus 402 and a transceiver 410. The transceiver 410 provides a communication interface or means for communicating with various other apparatus over a transmission medium. Depending upon the nature of the apparatus, a user interface 412 (e.g., keypad, display, speaker, microphone, joystick) may also be provided.

At least one processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software. In some aspects of the disclosure, the computer-readable medium 406 may include communication instructions 452. The communication instructions 452 may include instructions for performing various operations related to wireless communication (e.g., signal reception and/or signal transmission) as described herein. In some aspects of the disclosure, the computer-readable medium 406 may include processing instructions 454. The processing instructions 454 may include instructions for performing various operations related to signal processing (e.g., processing a received signal and/or processing a signal for transmission) as described herein.

At least one processor 404 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a card, a stick, or a key drive), a RAM, a ROM, a PROM, an EPROM, an EEPROM, a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, at least one processor 404 may include a communication circuit. The communication circuit may include one or more hardware components that provide the physical structure that performs various processes related to wireless communication (e.g., signal reception and/or signal transmission) as described herein. In some aspects of the disclosure, the processor 404 may also include a processing circuit. The processing circuit may include one or more hardware components that provide the physical structure that performs various processes related to signal processing (e.g., processing a received signal and/or processing a signal for transmission) as described herein. The circuitry included in the processor 404 is provided as non-limiting examples. Other means for carrying out the described functions exists and is included within various aspects of the present disclosure.

In some aspects of the disclosure, the processor 404 may include a CP length selection block 440, a CP length recommendation block 442, and a tone spacing block 444. The CP length selection block 440 may be configured to receive and process a CP length proposal that may be received from a cell or scheduling entity via the transceiver 410. The CP length proposal may include one or more CP lengths that may be used with a signal to communicate with the scheduling entity as described in relation to FIGS. 7-14. The CP length recommendation block 442 may be configured to determine or select a recommended CP length based on the CP length proposal and various factors as described in relation to FIGS. 7-14. The recommended CP length may include one or more CP lengths that may be the same or different from those provided by the CP length proposal.

The tone spacing block 444 may be configured to determine a tone spacing (a recommended tone spacing) based on a dynamic indication from a scheduling entity or cell. The dynamic indication may include a plurality of tone spacings. The tone spacing block 444 may be configured to determine the recommended tone spacing based on various factors as described in relation to FIG. 13.

In some aspects of the disclosure, the computer-readable medium 406 may store computer-executable code comprising instructions configured to perform various processes described herein, for example, in FIGS. 7-14. The instructions included in the computer-readable medium 406 are provided as non-limiting examples. Other instructions configured to carry out the described functions exist and are included within various aspects of the present disclosure.

In some aspects of the disclosure, the computer-readable medium 406 may store CP length code 452 and tone spacing code 454. The CP length code 452, when executed, may configure the processor 404 to perform the various processes and/or methods related to CP length described in relation to FIGS. 7-14. The tone spacing code 354, when executed, may configure the processor 404 to perform the various processes and/or methods related to tone spacing described in relation to FIG. 13.

The subordinate entity 204 may be interchangeably referred to as a "node," "apparatus," and/or "UE" (which are described in greater detail herein) without necessarily deviating from the scope of the present disclosure. To conserve power, some UEs may be in a sleep state (e.g., relatively low-power state or no-power state) during certain periods of time and only periodically in an awake state (e.g., relatively high-power state). During the awake states, the UEs may transmit various frames. Some frames may be discovery frames, and some frames may be non-discovery frames. The discovery frames may occur during discovery periods that are separated in time by a particular duration.

Figure 5:
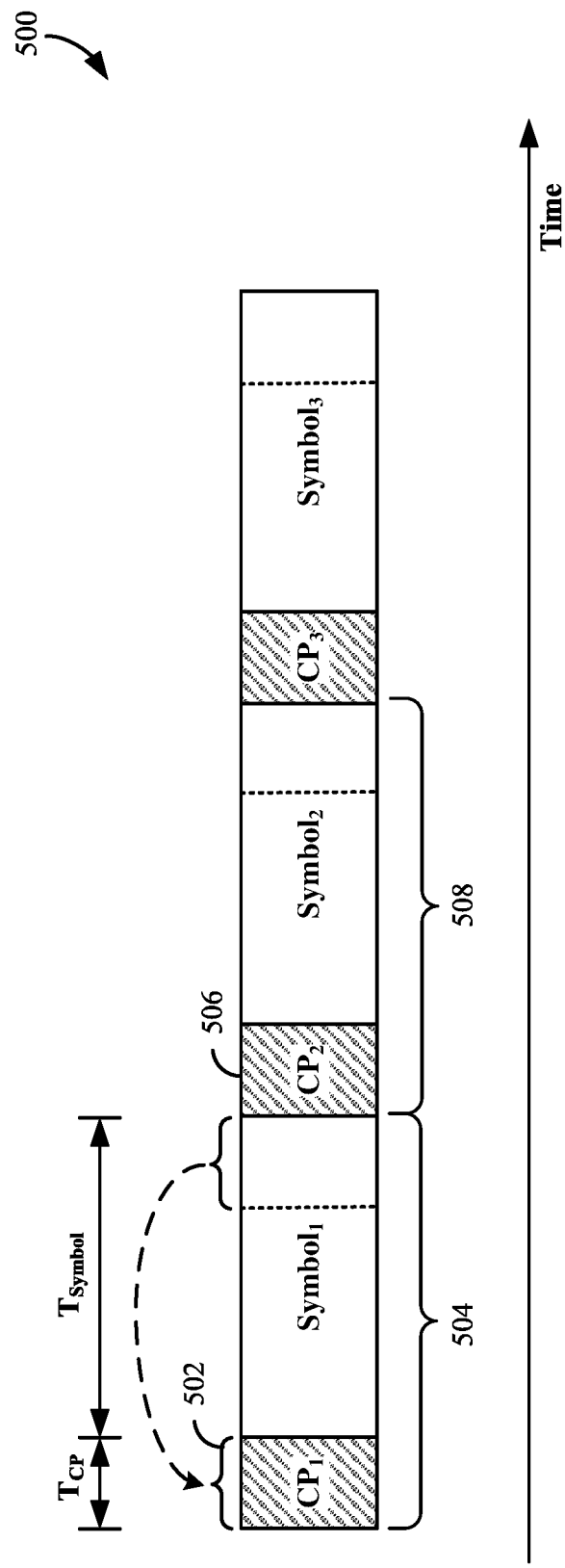
FIG. 5 is a diagram illustrating an example of a communication signal with a cyclic prefix (CP) according to some aspects of the present disclosure.
Figure 6:
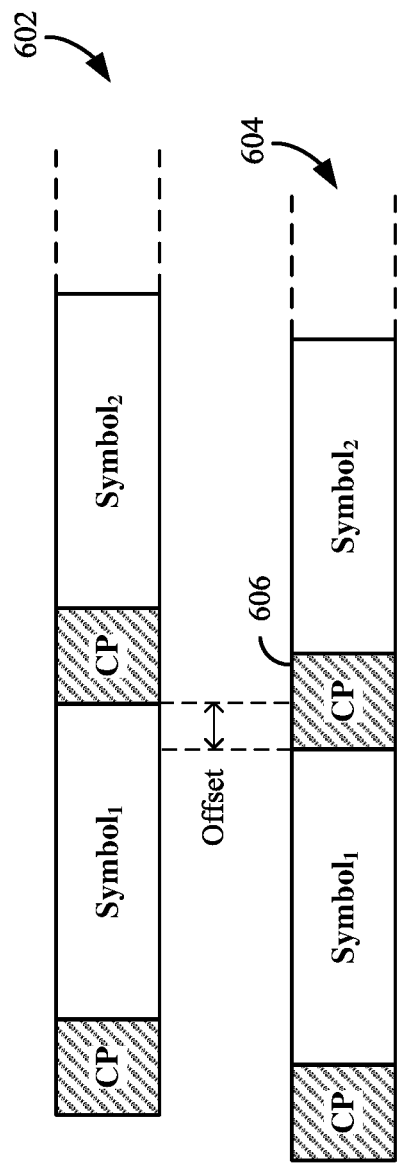
FIG. 6 is a diagram illustrating an example of a multiple-path delay of a communication signal according to some aspects of the present disclosure.

FIG. 5 is a diagram showing an example of a communication signal 500 according to some aspects of the present disclosure. The signal 500 illustrated in FIG. 5 shows that each symbol may have a cyclic prefix (CP). In one aspect of the disclosure, a CP refers to a repeated portion of the symbol that precedes that symbol. In other words, a symbol is preceded by a CP, and that CP repeats a portion (e.g., an end portion) of that symbol. For example, as illustrated in FIG. 5, $CP_1$ 502 repeats the end portion of $Symbol_1$ 504. Typically, the CP is discarded by the receiver (e.g., subordinate entity 204); however, the CP may have various purposes or functions. One of many purposes of the CP is to function as a guard interval for mitigating inter-symbol interference (ISI) from multipath communication for example due to delay spread. For example, $CP_2$ 506 may mitigate interference between $Symbol_1$ 504 and $Symbol_2$ 508. FIG. 6 is a diagram illustrating two multipath transmissions 602 and 604 of the same transmitted symbols. Due to delay spread, for example, the symbols of the two transmissions are offset in time. For example, the CP 606 may act as a buffer region such that the receiver can exclude the samples from the CP that were corrupted by the previous symbol when choosing the samples for a symbol.

The CP may have various lengths without deviating from the scope of the present disclosure. One of ordinary skill in the art will understand that any reference herein to 'length may also refer to related aspects such as duration, time, period, bits, and/or various other suitable aspects without necessarily deviating from the scope of the present disclosure. As such, any reference herein to 'CP length' may also refer to CP overhead, CP duration, CP time, CP period, CP bits, and/or various other suitable aspects without necessarily deviating from the scope of the present disclosure.

The selection of the length of a CP is an important consideration in an OFDM network. If the CP length is too small, it may not suitably compensate for multipath. On the other hand, if the CP length is too long, it wastes bandwidth. In Long-Term Evolution (LTE), a cell (e.g., base station(s) 110, 112) may implement a 'normal' CP length (e.g., 4.7 microsecond (μs)) or an 'extended' CP length (e.g., 16.7 μs) for a physical DL shared channel (PDSCH). Put another way, the cell may indicate to the UEs (e.g., UE(s) 122, 124, 126, 128, 134) in the coverage area of that cell (e.g., base station(s) 110, 112) to use a CP length of 4.7 μs or a CP length of 16.7 µs for certain communications. When multipath communication has relatively shorter multipath delays, the cell may implement relatively shorter CP lengths (e.g., 4.7 µs). When multipath communication has relatively longer multipath delays, the cell may implement relatively longer CP lengths (e.g., 16.7 µs).

Notably, the CP length $T_{CP}$ contributes to communication overhead. For example, the duration of a symbol $T_{symbol}+T_{CP}$ may be approximately 71 µs when using a 'normal' CP length of 4.7 which is approximately 7% of the duration of that symbol. In comparison, the duration of the symbol $T_{symbol}+T_{CP}$ may be approximately 83 µs when using an 'extended' CP length of 16.7 which is approximately 20% of the duration of that symbol. Because the CP length contributes to overhead, the CP length affects throughput. As mentioned above, the CP is typically discarded at the receiver (e.g., subordinate entity 204). Accordingly, any portion of the symbol not utilized for the CP length is utilized for carrying (un-discarded) information.

On the one hand, a CP length that is needlessly too long may adversely affect system performance by unnecessarily increasing overhead and thereby reducing throughput. On the other hand, a CP length that is too short may adversely affect system performance by resulting in unacceptable ISI and avoidable retransmissions. Additionally, communication conditions (e.g., multipath delay) may vary among UEs in the coverage area of a particular cell. For instance, a relatively shorter CP length may be appropriate for one UE while a relatively longer CP length may be appropriate for another UE. Accordingly, in some circumstances, a determination of the CP length based on various indications and/or factors may enable the cell and UE to communicate using a CP length that dynamically balances considerations of ISI and overhead/throughput.

In LTE, the UE or subordinate entity may receive an indication of a single CP length (e.g., a 'normal' CP length (e.g., 4.7 µs) or an 'extended' CP length (e.g., 16.7 µs)), and the UE utilizes that single CP length for wireless communication in a cell. In LTE, however, even if communication conditions vary (e.g., ISI increases or decreases due to varying conditions of multipath communication), the UE is bound to utilize the CP length indicated by the cell (e.g., eNB), even though an alternative CP length may either (i) provide reduced overhead and increased throughput (e.g., when conditions of the multipath communication are relatively good) or (ii) increase protection from ISI (e.g., when conditions of the multipath communication are relatively poor).

However, unlike LTE, aspects of the present disclosure provide for a CP length recommendation or proposal (e.g., dynamic indication) that enables the UE to determine a CP length from a plurality of CP lengths (e.g., a plurality of preselected or otherwise predetermined CP lengths), which may in some configurations be received from the scheduling entity 202, such as a base station, cell, and/or other suitable network entity. By enabling the UE to assist, select, and/or determine the CP length from a plurality of CP lengths, the UE may determine a CP length based on various factors, conditions, parameters, and other suitable aspects, which are described in greater detail below.

Figure 7:
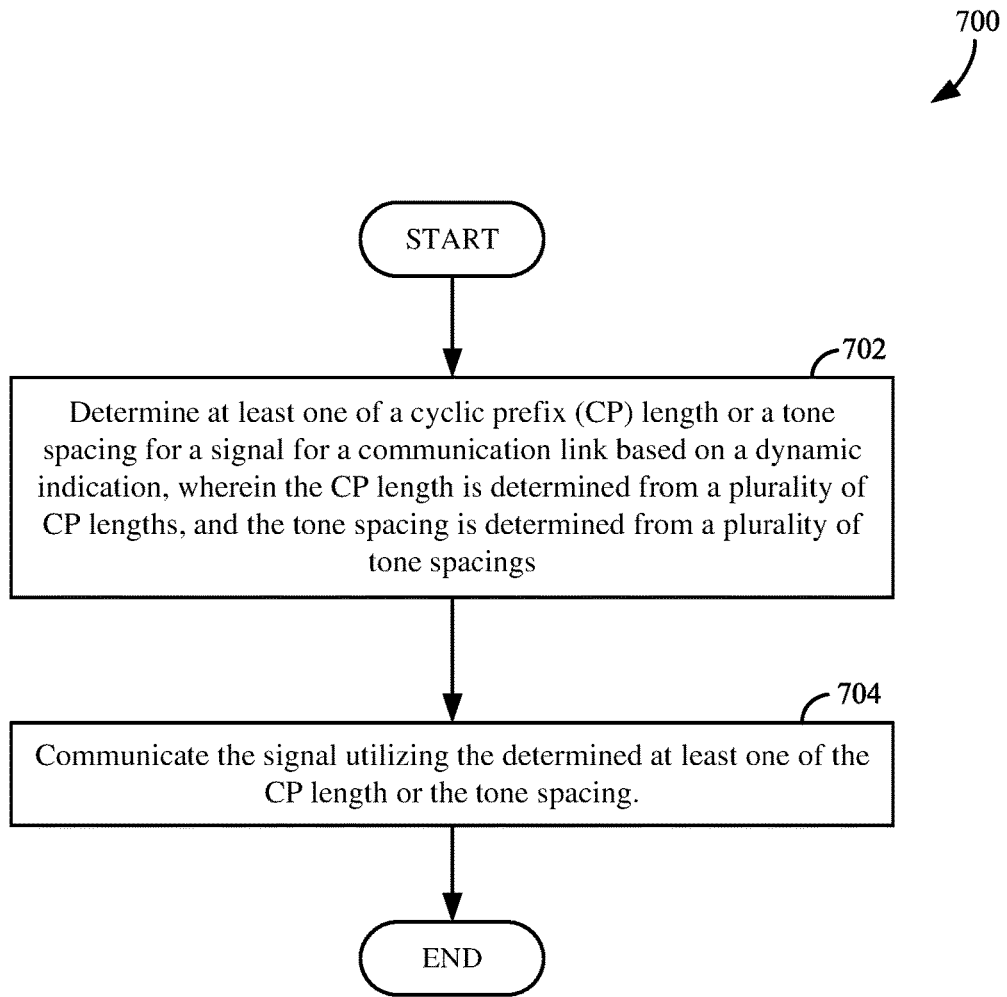
FIG. 7 is a diagram illustrating a process for determining a CP length by a node during wireless communication according to some aspects of the present disclosure.

FIG. 7 is a diagram illustrating a process 700 for determining a CP length by a node during wireless communication according to some aspects of the present disclosure. In some configurations, the process 700 may be performed and/or implemented in the scheduling entity 202, subordinate entity 204, and/or any one or more of the various devices described in detail herein, for example, in relation to FIGS. 1-4.

At block 702, a node determines at least one of a CP length or a tone spacing for a signal for a communication link based on a dynamic indication. The CP length is determined from a plurality of CP lengths, and the tone spacing is determined from a plurality of tone spacings. In one example, the node may utilize the CP length selection block 340 (see FIG. 3) or CP length selection block 440 (see FIG. 4) to determine the CP length. In one example, the node may utilize the tone spacing block 334 (see FIG. 3) or tone spacing block 444 (see FIG. 4) to determine the tone spacing. At block 704, the node communicates the signal utilizing the determined at least one of the CP length or the tone spacing. In one example, the node may utilize the communication interface 310 or 410 to communicate the signal. Exemplary implementations of the process 700 will be described below in relation to FIGS. 8-16.

Figure 8:
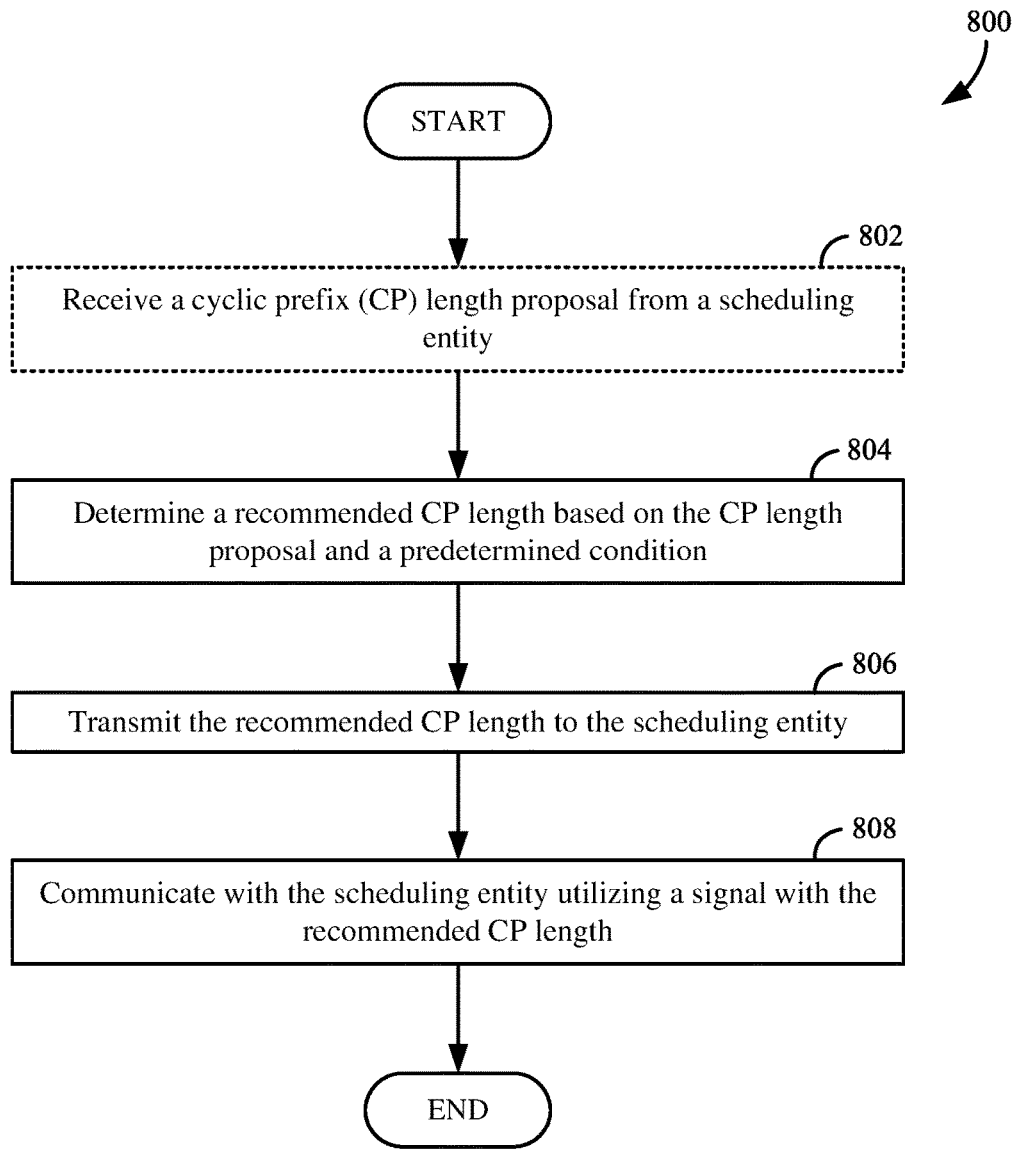
FIG. 8 is a diagram illustrating an example of a wireless communication method using a CP length selected with the assistance of a subordinate entity according to some aspects of the present disclosure.

FIG. 8 is a flow chart illustrating an example of various methods and/or processes 800 for determining a CP length during wireless communication according to some aspects of the present disclosure. In some configurations, such methods and/or processes may be performed and/or implemented in the subordinate entity 204 and/or any one or more of the various UEs described in greater detail herein. Although the description provided below with reference to FIG. 8 makes reference to a UE, one of ordinary skill in the art will understand that such methods and/or processes may be performed and/or implemented in various apparatuses and in various arrangements, sequences, and/or orders without necessarily deviating from the scope of the present disclosure. One of ordinary skill in the art will appreciate that any aspect(s) of the methods and/or processes described with reference to FIG. 8 may be included in, added to, substituted for, or incorporated into, and/or otherwise used to modify any aspect(s) of the methods and/or processed described with reference to FIGS. 7 and 9-16 without necessarily deviating from the scope of the present disclosure.

At block 802, the UE may receive information including a CP length proposal from a scheduling entity 202. In some examples, the UE may utilize a CP length selection block 440 (see FIG. 4) to receive a CP length proposal from the scheduling entity 202, such as a base station, cell, and/or other suitable network entity. In some aspects of the disclosure, the CP length proposal may include a plurality of CP lengths (e.g., two or more CP lengths) that may be used with a signal to communicate with the scheduling entity. The CP length proposal may be a dynamic indication in the sense that the scheduling entity may provide different CP length proposal in different conditions and time intervals. For example, the CP length proposal may be controlled or updated per TTI, UE, transmission, cell, symbol, or other criteria.

At block 804, the UE may determine a recommended CP length for a communication link based on the CP length proposal and a predetermined condition. For example, the UE may utilize a CP length recommendation block 442 (see FIG. 4) to determine the recommended CP length. The UE may select the recommended CP length from the plurality of CP lengths included in the CP length proposal based on, for example, at least one of a modulation and coding scheme (MCS), a subcarrier spacing, a service type, a communication link direction, a rank number, a type or a capability of the subordinate entity, or a number of subordinate entities scheduled in a same TTI. In other aspects of the disclosure, other predetermined condition(s) may be considered. In some examples, the UE may not receive a CP length proposal from the scheduling entity, and/or may determine a recommended CP length that is different from those provided by the CP length proposal. In some aspects of the disclosure, the UE may receive a restricted set of CP lengths (e.g., included in the CP length proposal) that includes a subset of CP lengths that the scheduling entity may utilize to communicate with UEs or subordinate entities in a cell or network. The scheduling entity may send different sets of CP lengths or recommended CP lengths to different subordinate entities.

At block 806, the UE may transmit the recommended CP length to the scheduling entity. For example, the UE may utilize a CP length recommendation block 342 and/or a transceiver 410 (see FIG. 4) to transmit the recommended CP length to the scheduling entity 202 in UL control information 212 (see FIG. 2) or other suitable methods. In response, the scheduling entity may schedule the UE to use the recommended CP length. For example, the scheduling entity may signal the CP length in downlink control channel 208 (see FIG. 2) or other suitable methods. At block 808, the UE may communicate with the scheduling entity via a transceiver 410 utilizing a signal with the recommended CP length. For example, the signal may be downlink data, uplink data, sidelink data, and/or other communication signals.

For example, referring to FIG. 5, the UE may determine the duration of $T_{CP}$ of $CP_1$ 502 of $Symbol_1$ 504. Such aspects of the present disclosure vary from aspects of other systems, such as those in LTE. In some configurations, the term(s) 'communicate,' 'communicating,' and/or 'communication' may refer to 'receive,' 'receiving,' 'reception,' and/or other related or suitable aspects without necessarily deviating from the scope of the present disclosure. In some configurations, the term(s) 'communicate,' 'communicating,' 'communication,' may refer to 'transmit,' 'transmitting,' 'transmission,' and/or other related or suitable aspects without necessarily deviating from the scope of the present disclosure.

The present disclosure describes many aspects related to a plurality of CP lengths or CP length proposal provided by a scheduling entity. In some configurations, the plurality of CP lengths may be determined by configurations that differ from configurations that configure a plurality of CP lengths for another UE. For example, the plurality of CP lengths may be set for one UE by configurations that are unique or individual to that particular UE. In some configurations, the plurality of CP lengths are configured using cell-specific signaling that is the same as cell-specific signaling used to configure a plurality of CP lengths for another UE. Generally, cell-specific signaling may refer to a set of one or more signals exchanged between a scheduling entity 202 (e.g., base station, cell, and/or other suitable network entity) and a subordinate entity 204 (e.g., UE) for establishing or otherwise determining one or more parameters, settings, and/or configurations associated with the CP length used for communicating a signal or symbols. For example, two UEs in the coverage area of a single cell may receive their respective configurations via the same cell-specific signaling. In some configurations that involve semi-persistent scheduling (SPS), such signaling may include or be associated with radio resource control (RRC) messages. Accordingly, in some configurations, the plurality of CP lengths may be configured by RRC. In some configurations, the plurality of CP lengths include a plurality of sets of CP lengths. Each of the sets of CP lengths may be associated with one or more factors. Non-limiting examples of such factors include a modulation and coding scheme (MCS), subcarrier spacing, service type, communication link direction, rank number, type or capability of the node (e.g., UE, subordinate entity), and/or number of nodes scheduled in the same TTI. Additional description related to such factors is provided further below (e.g., with reference to block 804).

In some configurations, at block 804, the UE may determine the CP length based on one or more factors (e.g., a predetermined condition). Such factors may affect the tolerance of the UE for aggressive CP management. In some circumstances, the UE may tolerate relatively more aggressive CP management, meaning that the UE may tolerate relatively shorter CP lengths. In some other circumstances, the UE may tolerate relatively less aggressive CP management, meaning that the UE may need relatively longer CP lengths. Various non-limiting examples of such factors are described in greater details below. One of ordinary skill in the art will understand that any one or more of these factors may be utilized to determine the CP length without necessarily deviating from the scope of the present disclosure.

Figure 9:
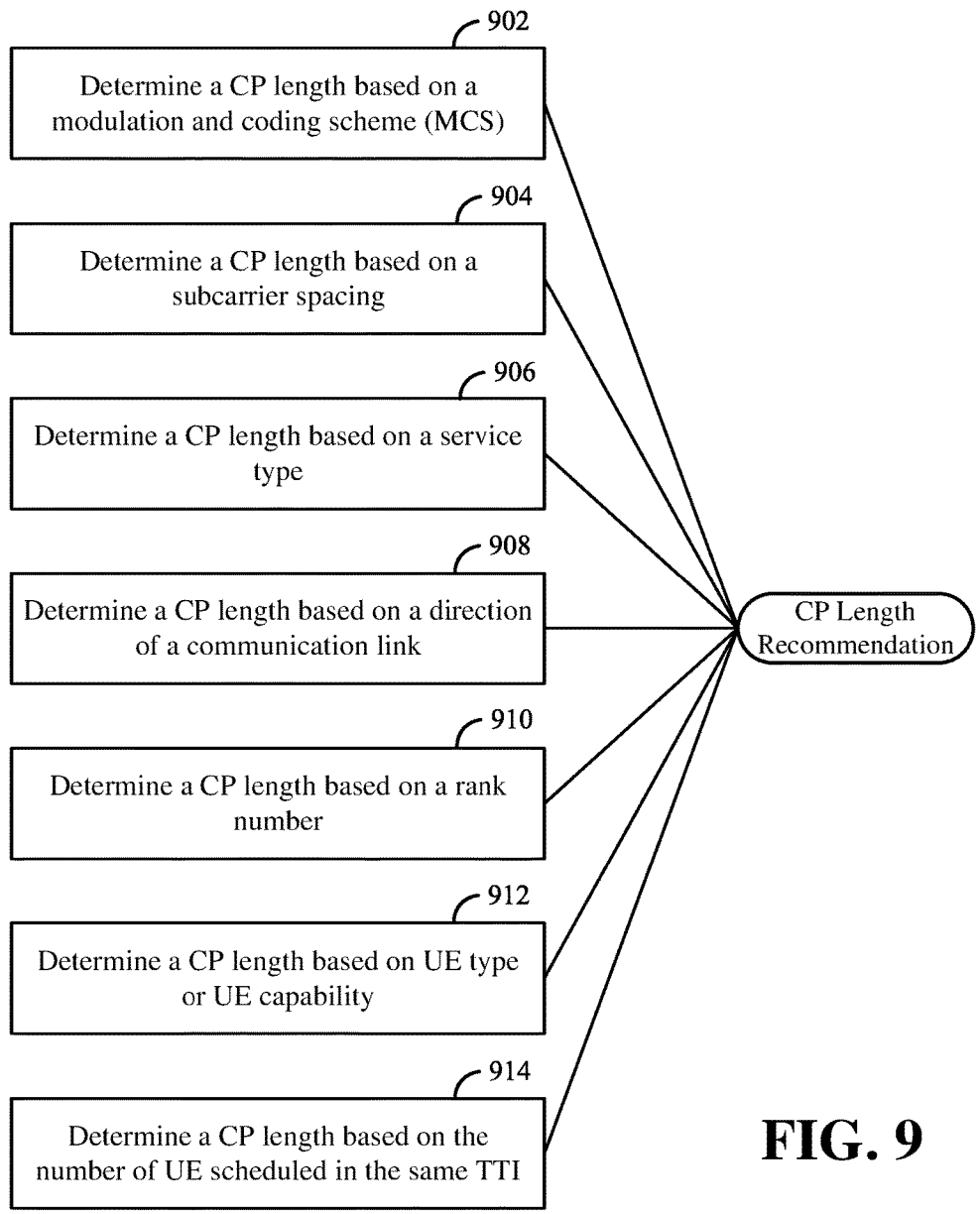
FIG. 9 is a diagram illustrating some factors for determining a CP length according to some aspects of the present disclosure.

Some factors for determining the CP length are illustrated in FIG. 9. These exemplary factors illustrated in FIG. 9 may be utilized by a subordinate entity or UE in block 804 to determine the recommended CP length. One example of such a factor is the MCS. Generally, the UE may tolerate relatively more aggressive CP management for relatively lower MCS and relatively less aggressive CP management for relatively higher MCS. For instance, the UE may tolerate relatively shorter CP lengths for relatively lower MCS, but the UE may need relatively longer CP lengths for relatively higher MCS. Accordingly, in some configurations, at block 902, the UE may determine the recommended CP length further based on the MCS.

Another example of such a factor is subcarrier spacing. Generally, the UE may tolerate relatively more aggressive CP management for certain subcarrier spacings and relatively less aggressive CP management for other subcarrier spacings. For example, the UE may tolerate relatively shorter CP lengths for relatively longer subcarrier spacings, but the UE may need relatively longer CP lengths for relatively shorter subcarrier spacings. Accordingly, in some configurations, at block 904, the UE may determine the CP length further based on subcarrier spacing.

Yet another example of such a factor is service type. Non-limiting examples of service type include multimedia broadcast multicast service (MBMS), unicast, and various other suitable types of service. The UE may tolerate relatively more aggressive CP management for some service types and relatively less aggressive CP management for some other service types. For example, the UE may tolerate relatively shorter CP lengths for unicast service, but the UE may need relatively longer CP lengths for MBMS service and/or groupcast service. Accordingly, in some configurations, at block 906, the UE may determine the CP length further based on the service type.

A further example of such a factor is the direction of the communication link. For instance, the communication link direction may be UL, DL, or sidelink. Sidelink may refer to communications between various UEs or P2P communications. Generally, the UE may tolerate relatively more aggressive CP management for certain communication link directions and relatively less aggressive CP management for other communication link directions. For example, the UE may tolerate relatively shorter CP lengths for certain communication link directions, but the UE may need relatively longer CP lengths for other communication link directions. As an example, CP management may consider different number of cells involved in DL operation and in UL operation for a UE. For instance, two cells may be involved in DL operation for a UE (e.g., joint transmission), while only one cell is involved in UL serving the UE. In this case, different CP lengths may be used for the DL and UL, respectively. Accordingly, in some configurations, at block 908, the UE may determine the CP length further based on the direction of the communication link.

An additional example of such a factor is rank number. For instance, the UE may tolerate relatively more aggressive CP management for a rank 1 transmission and relatively less aggressive CP management for a rank 2 or higher rank transmission. A rank may refer to the number of antennas or streams utilized for the communication link. That is, the UE may tolerate relatively shorter CP lengths for a lower rank (e.g., rank 1) transmission, but the UE may need relatively longer CP lengths for a higher rank (e.g., rank 2) transmission. Accordingly, in some configurations, at block 910, the UE may determine the CP length further based on the rank number of the communication link.

Another example of such a factor is the type or capability of the UE. For instance, the UE may be an Internet-of-Things (IoT) apparatus or a non-IoT apparatus. The UE may tolerate relatively more aggressive CP management if it is of a particular type or has a particular capability, and relatively less aggressive CP management if it is of another type or has another capability. For instance, the UE may tolerate relatively shorter CP lengths if it is of a particular type or has a particular capability, but the UE may need relatively longer CP lengths if it is of another type or has another capability. Accordingly, in some configurations, at block 912, the UE may determine the CP length further based on the type or capability of the UE. As an example, a low cost or coverage extension UEs (e.g., IoT devices) may be associated with a longer CP for simpler implementation, while a smart-phone UE may have more processing power and consequently can be associated with a shorter CP. A device with more processing power may be able to handle ISI even with a shorter CP.

Yet another example of such a factor is the number of UEs scheduled in the same TTI. If no other UEs are scheduled in that same TTI, the CP length may be optimized for the one UE using that TTI (without considering the other UEs). If, however, other UEs are scheduled in that same TTI, the CP length may be optimized for a group of UEs using that TTI. The tolerance of any particular UE with respect to CP management (e.g., CP length) may be affected by the number of other UEs using the same TTI. Accordingly, in some configurations, at block 914, the UE may determine the CP length further based on the number of UEs scheduled in the same TTI. For example, the CP length may be determined so as to mitigate or avoid ISI of the UEs scheduled in the same TTI.

In one example, when an MCS index is at or below a threshold, a longer CP is used; otherwise, a shorter CP is used. As another example, when a subcarrier spacing is at first predetermined value (e.g., 15 kHz), either a longer CP or a shorter CP is used (e.g., depending on an MCS index). However, when a subcarrier spacing is at a second predetermined value (e.g., 30 kHz) that is higher than the first value, a shorter CP is used for all MCS indices. In one example, a shorter CP may be used for all MIMO transmissions of two or more layers.

In one example, an Ultra-Reliable Low Latency Communications (URLLC) service may be associated with a shorter CP as compared with an enhanced Mobile Broadband (eMBB) service. In one example, a higher speed UE may be associated with a longer CP than a low mobility or stationary UE. In one example, a longer CP may be used for DL when two or more cells are involved in a single frequency network (SFN) or a Cooperative Multi-Point (CoMP) operation, while a shorter CP may be used for UL when only a single cell is serving the UE in the UL. In one example, a low-cost or coverage-enhancement UE may use a longer CP as compared with a shorter CP used by a smart-phone UE with relatively more processing power. In one example, when two or more UEs are scheduled in a same subframe, a CP may be chosen to suit the combined need (e.g., ISI mitigation) of the two or more UEs, especially considering the potential mutual interference if different CPs were used for the UEs.

Figure 10:
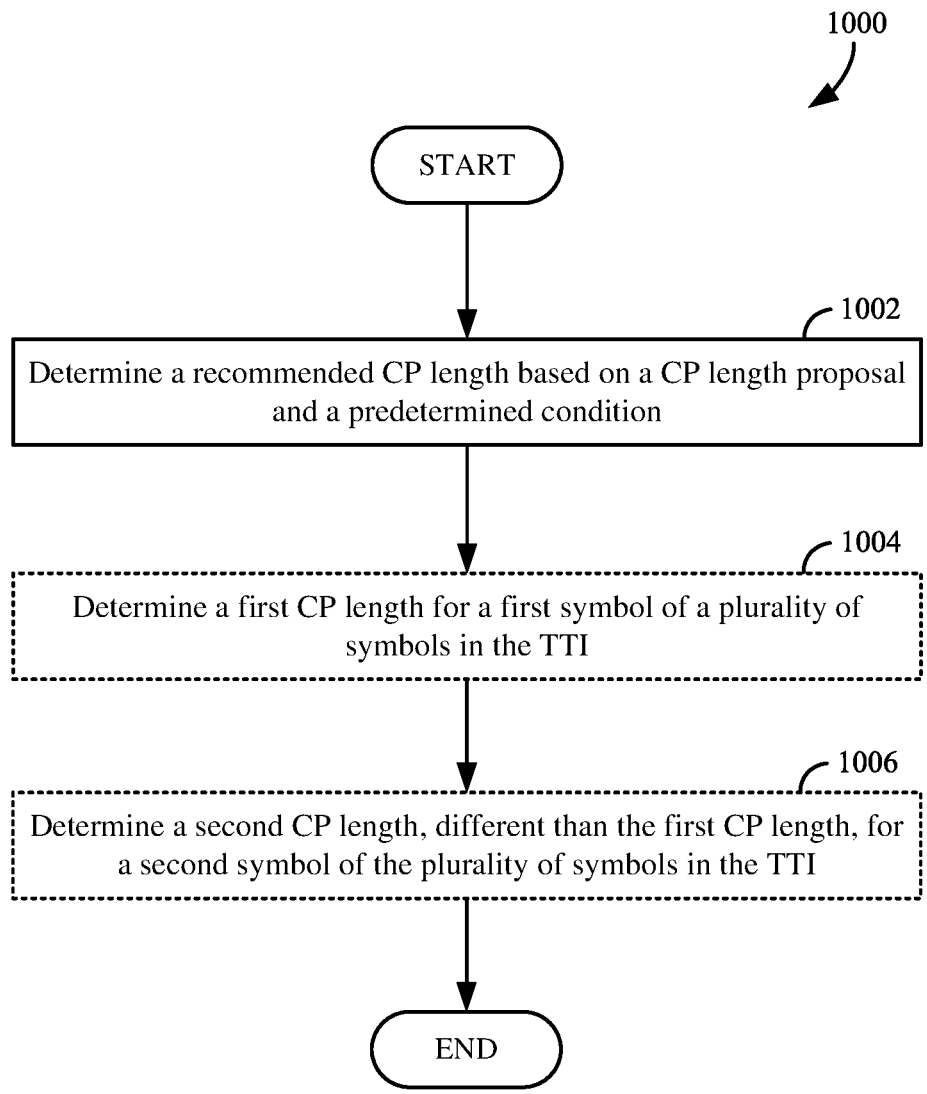
FIG. 10 is a diagram illustrating an example of determining different CP lengths for different symbols according to some aspects of the present disclosure.

FIG. 10 is a diagram illustrating a process 1000 for determining different CP lengths for different symbols according to some aspects of the present disclosure. In some configurations, such methods and/or processes may be performed and/or implemented in the subordinate entity 204 and/or any one or more of the various UEs described in greater detail herein. Although the description provided below with reference to FIG. 10 makes reference to a UE, one of ordinary skill in the art will understand that such methods and/or processes may be performed and/or implemented in various apparatuses and in various arrangements, sequences, and/or orders without necessarily deviating from the scope of the present disclosure. One of ordinary skill in the art will appreciate that any aspect(s) of the methods and/or processes described with reference FIG. 10 may be included in, added to, substituted for, or incorporated into, and/or otherwise used to modify any aspect(s) of the methods and/or processed described with reference to FIGS. 7-9 and 11-15 without necessarily deviating from the scope of the present disclosure.

In one example, the method of FIG. 10 may be performed by a subordinate entity 204 (e.g., UE) at block 804 of FIG. 8. At block 1002, the UE may determine a recommended CP length for a communication link based on a CP length proposal and a predetermined condition, and the UE may determine a particular CP length from a plurality of CP lengths included in the CP length proposal. (Additional description related to block 1002 is provided above with reference to block 804 in FIG. 8 and therefore will not be repeated to avoid redundancy.)

In some configurations, the UE may determine different CP lengths for different symbols, for example, in the same TTI. The UE may determine different CP lengths for different symbols for various reasons. In some circumstances, the UE may determine different CP lengths for different symbols due to different needs of multiplexing with other UEs. In some examples, the CP length proposal (e.g., a dynamic indication) described above with reference to block 1002 may include a dynamic indication (to the UE) about the specific CP lengths for specific symbols.

In such configurations, at block 1004, the UE may determine a first CP length for a first symbol of a plurality of symbols and, at block 1006, determine a second CP length, different from the first CP length, for a second symbol of the plurality of symbols. For example, referring to FIG. 5, the UE may determine a particular CP length for $CP_1$ of $Symbol_1$ and determine a different CP length for $CP_2$ of $Symbol_2$. The symbols may be in the same TTI or different TTIs.

One of ordinary skill in the art will understand that FIG. 5 provides a conceptual diagram for illustrative purposes without necessarily being to scale or necessarily showing the exact or relative lengths or durations of the CPs and/or symbols. In other words, the CPs and/or symbols may have various lengths or durations, even if varying from those shown in FIG. 5, without necessarily deviating from the scope of the present disclosure.

After determining the CP length (recommended CP length), the UE may communicate with the scheduling entity utilizing a signal using the determined CP length as described above at blocks 806 and 808. (Additional description related to blocks 806 and 808 is provided above with reference to FIG. 8 and therefore will not be repeated to avoid redundancy.)

Figure 11:
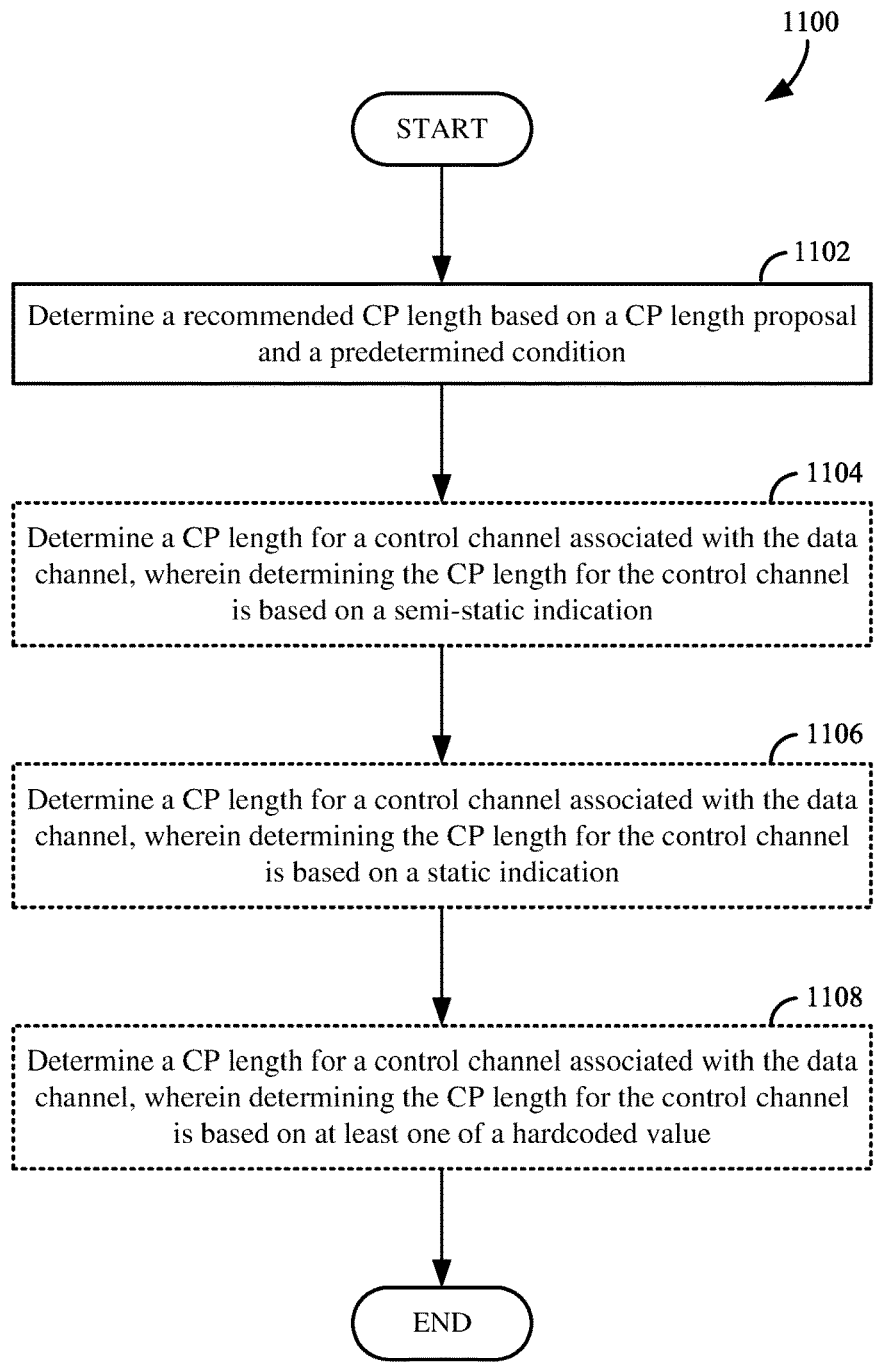
FIG. 11 is a diagram illustrating an example of determining a CP length of a control channel based on various methods according to some aspects of the present disclosure.

FIG. 11 is a diagram illustrating an example of determining a CP length of a control channel based on various methods 1100 according to some aspects of the present disclosure. In some configurations, such methods and/or processes may be performed and/or implemented in the subordinate entity 204 and/or any one or more of the various UEs described in greater detail herein. Although the description provided below with reference to FIG. 11 makes reference to a UE, one of ordinary skill in the art will understand that such methods and/or processes may be performed and/or implemented in various apparatuses and in various arrangements, sequences, and/or orders without necessarily deviating from the scope of the present disclosure. One of ordinary skill in the art will appreciate that any aspect(s) of the methods and/or processes described with reference FIG. 11 may be included in, added to, substituted for, or incorporated into, and/or otherwise used to modify any aspect(s) of the methods and/or processed described with reference to FIGS. 7-10 and 12-15 without necessarily deviating from the scope of the present disclosure.

In one example, the method of FIG. 11 may be performed by a subordinate entity 204 (e.g., UE) at block 804 of FIG. 8. At block 1102, the UE may determine a recommended CP length for a communication link based on a CP length proposal (e.g., a dynamic indication) and a predetermined condition, and the UE may determine a particular CP length (recommended CP length) from a plurality of CP lengths included in the CP length proposal. (Additional description related to block 1102 is provided above with reference to block 804 in FIG. 8 and therefore will not be repeated to avoid redundancy.) After determining the CP length, the UE may communicate with the scheduling entity utilizing a signal with that determined CP length as described above at blocks 806 and 808. (Additional description related to blocks 806 and 808 is provided above with reference to FIG. 8 and therefore will not be repeated to avoid redundancy.)

In some configurations, the above-described signal is communicated on a data channel (e.g., DL data 206 or UL data 210 of FIG. 2). In such configurations, the UE may determine the CP length for a control channel (e.g., DL control 208 or UL control 212 of FIG. 2) associated with that data channel The determination of the CP length for that control channel may be based on a semi-static indication at block 1104, a static indication at block 1106, and/or a hardcoded value at block 1108.

As an example, a semi-static indication may be based on a higher-layer configuration for a UE or a system information broadcast for a UE. A static indication may be via an association with a UE category. A hard-coded value may be in the form of a value in an equation, in a table, or any other format.

Figure 12:
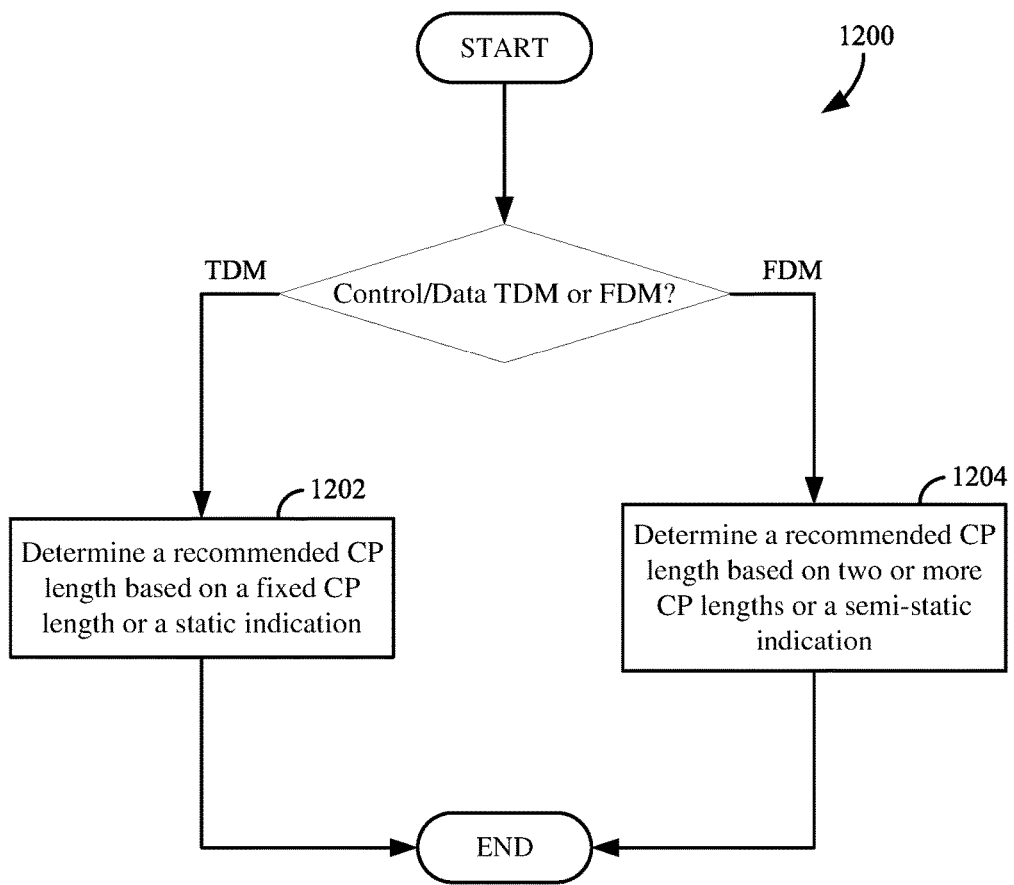
FIG. 12 is a diagram illustrating an example of determining a control channel CP length according to some aspects of the present disclosure.

FIG. 12 is a diagram illustrating a method 1200 for determining a control channel CP length according to some aspects of the present disclosure. In some configurations, such method may be performed and/or implemented in the subordinate entity 204, scheduling entity 202, and/or any one or more of the various apparatuses described in greater detail herein. In some examples, at block 1202, the determination may be based on a fixed CP length or a static indication if the control channel is time-division multiplexed (TDM) with data. For example, the symbols of the control channel may be fixed to the same CP length. In some examples, at block 1204, the determination may be based on two or more CP lengths or a semi-static indication if the control channel is frequency-division multiplexed (FDM) with data. In such examples, the UE may perform blind decodes to determine which CP length is in use for a control transmission. To facilitate a single fast Fourier transform (FFT) operation, the total symbol length for control with a first CP length and the total symbol length for data with a second CP length can be the same.

Figure 13:
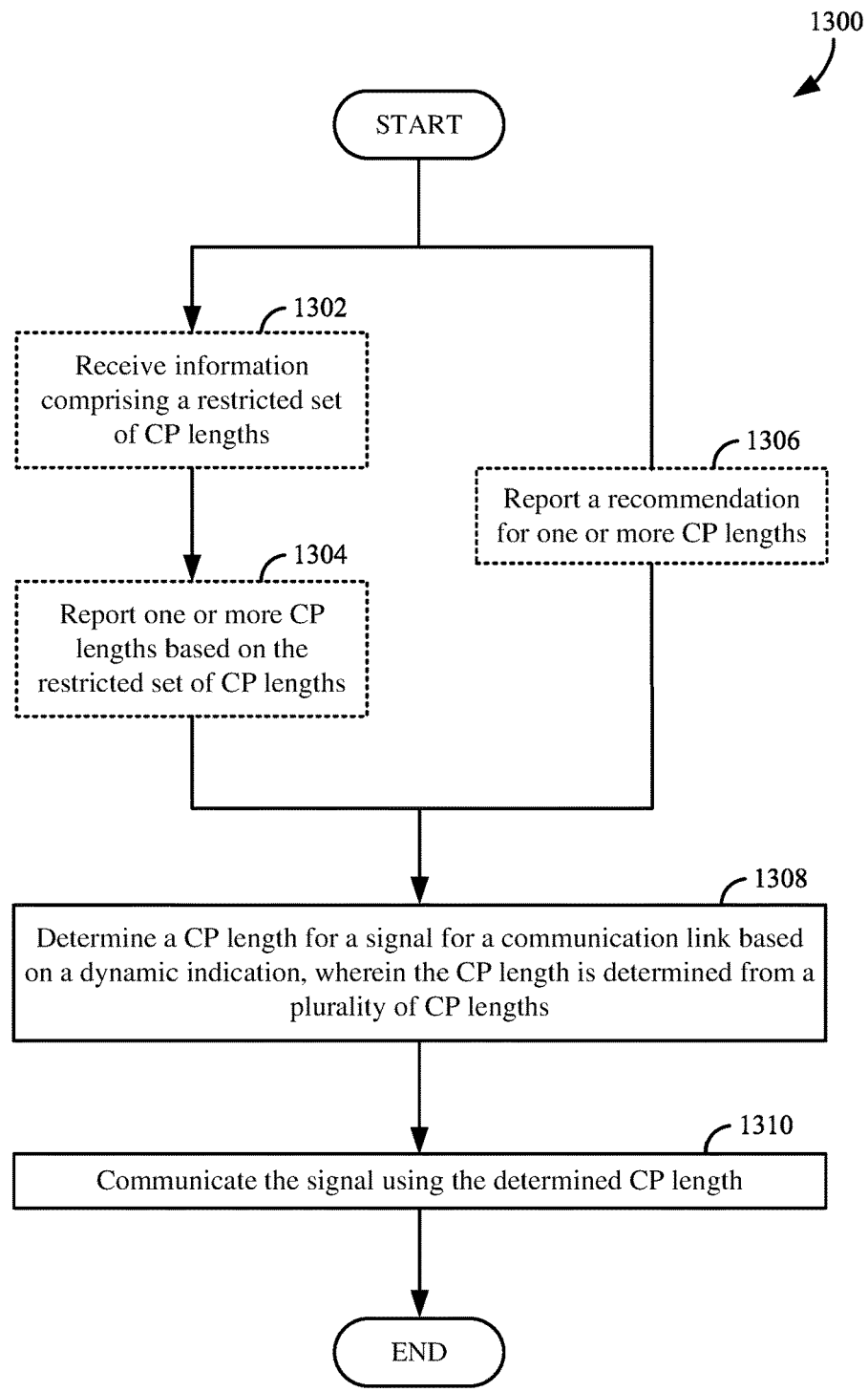
FIG. 13 is a diagram illustrating an example of determining a CP length at a subordinate entity according to some aspects of the present disclosure.

FIG. 13 is a diagram illustrating an exemplary process 1300 for determining a CP length according to some aspects of the present disclosure. In some configurations, such methods and/or processes may be performed and/or implemented in the subordinate entity 204 and/or any one or more of the various UEs described in greater detail herein. Although the description provided below with reference to FIG. 13 makes reference to a UE, one of ordinary skill in the art will understand that such methods and/or processes may be performed and/or implemented in various apparatuses and in various arrangements, sequences, and/or orders without necessarily deviating from the scope of the present disclosure. One of ordinary skill in the art will appreciate that any aspect(s) of the methods and/or processes described with reference FIG. 13 may be included in, added to, substituted for, or incorporated into, and/or otherwise used to modify any aspect(s) of the methods and/or processed described with reference to FIGS. 7-12 and 14-15 without necessarily deviating from the scope of the present disclosure.

The UE may, at block 1308, determine a CP length for a signal for a communication link (as described in greater detail above with reference to block 804 in FIG. 8) and, at block 1310, may communicate the signal using the determined CP length (as described in greater detail above with reference to block 808 in FIG. 8). However, the UE may also perform some additional methods and/or processes before those of blocks 1308, 1310. Non-limiting examples of configurations enabling such additional methods and/or processes before those of blocks 1308, 1310 are provided below.

In some configurations, at block 1302, the UE may receive information that includes a restricted set of CP lengths. For example, the UE may receive a list of four possible choices for the CP length. At block 1304, the UE may report one or more CP lengths (recommended CP lengths) based on the restricted set of CP lengths. For example, the UE may report a list of two possible choices (selected from that received list of four possible choices) of CP lengths back to the cell. For example, the UE may receive a finite list of different CP lengths from the cell or scheduling entity, and that finite list of different CP lengths may provide various options of CP lengths that the UE can use to communicate a signal. In response to receiving such information, the UE may provide feedback to the cell by reporting back a subset (e.g., a sub-list, a smaller list, etc.) of different CP lengths that the UE may prefer to use based on various factors (e.g., such as any one or more of the factors described in greater detail above). In response to receiving such reported information from the UE, the cell may select a particular CP length for communications with the UE.

In some other configurations, at block 1306, the UE may report a recommendation for one or more CP lengths (or recommended CP lengths). For example, the UE may recommend a particular CP length (or a particular list of CP lengths) based on one or more factors (such as any one or more of the factors described in greater detail above). In response to receiving such reported information from the UE, the cell may select a particular CP length for communications with the UE.

The two non-limiting examples of configurations described above enable aspects that vary from those of existing systems, such as LTE. Unlike in LTE, such configurations of the present disclosure enable the UE to provide input, feedback, impact, and/or influence with respect to CP management (e.g., selection of the appropriate CP length). Even though the cell or scheduling entity may perform the actual selection of the specific CP length, the cell can make such a selection in view of information (e.g., recommended CP length(s)) provided by the UE. By doing so, there is at least some increase in the likelihood of selecting an optimal CP length.

Figure 14:
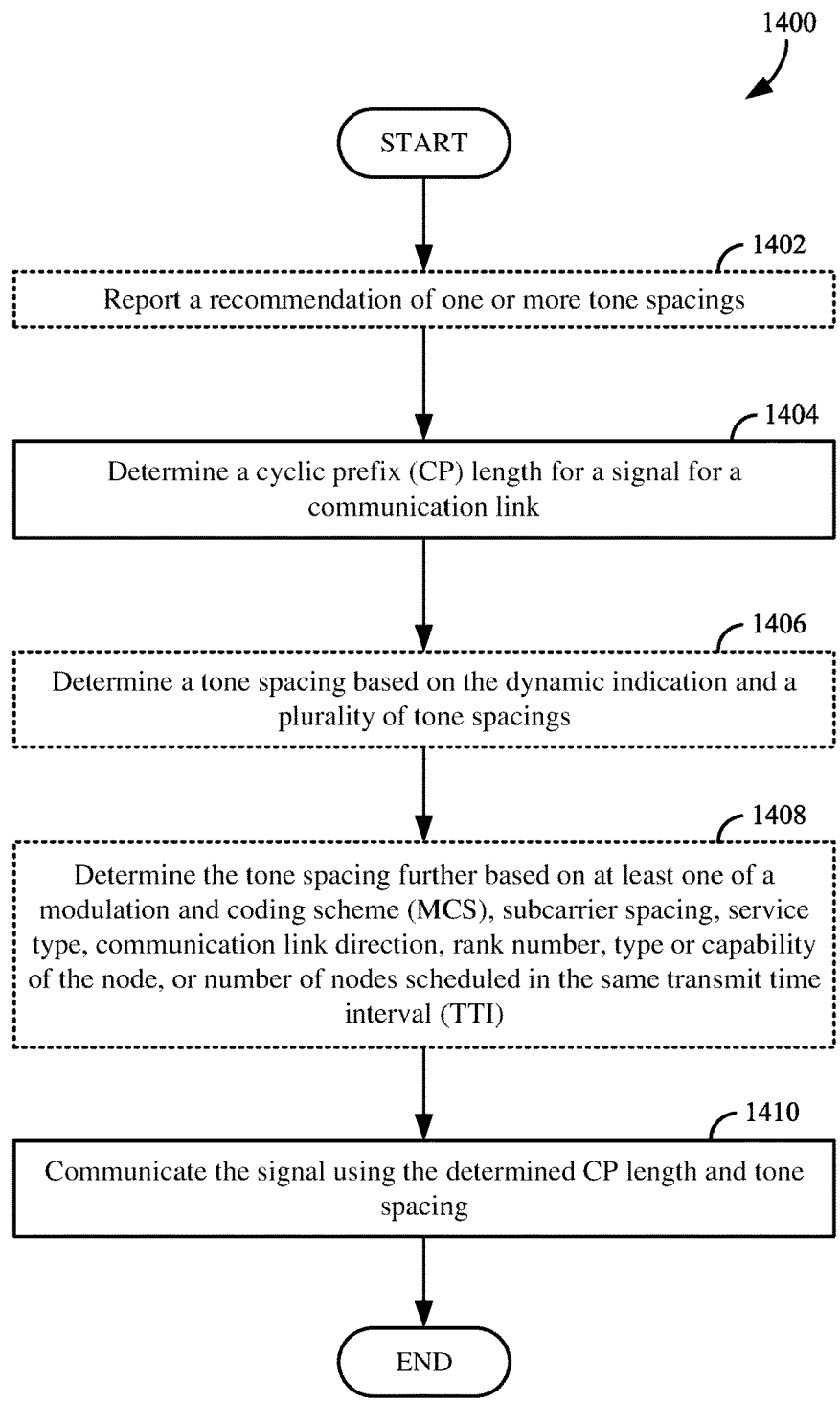
FIG. 14 is a diagram illustrating an example of determining a tone spacing for wireless communication according to some aspects of the present disclosure.

FIG. 14 is a diagram illustrating an exemplary process 1400 for determining a tone spacing for wireless communication according to some aspects of the present disclosure. In some configurations, such methods and/or processes may be performed and/or implemented in the subordinate entity 204 and/or any one or more of the various UEs described in greater detail herein. Although the description provided below with reference to FIG. 14 makes reference to a UE, one of ordinary skill in the art will understand that such methods and/or processes may be performed and/or implemented in various apparatuses and in various arrangements, sequences, and/or orders without necessarily deviating from the scope of the present disclosure. One of ordinary skill in the art will appreciate that any aspect(s) of the methods and/or processes described with reference FIG. 14 may be included in, added to, substituted for, or incorporated into, and/or otherwise used to modify any aspect(s) of the methods and/or processed described with reference to FIGS. 7-13 and 15 without necessarily deviating from the scope of the present disclosure.

In some configurations, at block 1402, the UE may utilize a tone spacing block 444 to report a recommendation of one or more tone spacings (recommended tone spacings). For example, the UE may provide at least some information to the cell or scheduling entity about a particular set (or a particular list) of spacings between tones (e.g., OFDM tones). At block 1404, the UE may utilize a CP length recommendation block 442 to determine the CP length for a signal for a communication link (as described in greater detail above with reference to block 804 of FIG. 8). In some configurations, at block 1406, the UE may utilize the tone spacing block 444 to determine a tone spacing based on a dynamic indication and a plurality of tone spacings. In some configurations, the UE may receive the dynamic indication and/or plurality of tone spacings from the scheduling entity 202, such as a base station, cell, and/or other suitable network entity. In some configurations, the dynamic indication may include a list of a plurality of tone spacings, based on which the UE may select or recommend the tone spacing to use for the communication.

In some configurations, at block 1408, the UE may utilize the tone spacing block 444 to determine the tone spacing further based on one or more factors. Non-limiting examples of such factors include MCS, subcarrier spacing, service type, communication link direction, rank number, type or capability of the UE, and/or number of UEs scheduled in the same TTI. Additional description pertaining to such factors is provided above (e.g., with reference to FIG. 9) and therefore will not be repeated).

As an example, a UE using a low latency service may use a larger tone spacing, which results in a shorter time duration, in order to benefit from a reduction in transmission time and hence reduced over-the-air latency. A low-cost or a coverage-extension UE may use a smaller tone spacing, which results in a longer time duration, in order to help improve coverage.

After the tone spacing has been determined, the UE may communicate the signal using the determined CP length and tone spacing. In some configurations, the term(s) 'communicate,' 'communicating,' and/or 'communication' may refer to 'receive,' 'receiving,' 'reception,' and/or other related or suitable aspects without necessarily deviating from the scope of the present disclosure. In some configurations, the term(s) 'communicate,' 'communicating,' 'communication,' may refer to 'transmit,' 'transmitting,' 'transmission,' and/or other related or suitable aspects without necessarily deviating from the scope of the present disclosure.

Although the examples described herein (e.g., with reference to FIGS. 7-15) may describe certain features, operations, processes, methods, and/or aspects from the perspective of a subordinate entity 204 (e.g., UE), one of ordinary skill in the art will understand that corresponding features, operations, processes, methods, and/or aspects from the perspective of the scheduling entity 202 (e.g., base station, cell, and/or other network entity) are readily ascertainable and understood from the present disclosure and, therefore, would not deviate from the scope of the present disclosure.

Figure 15:
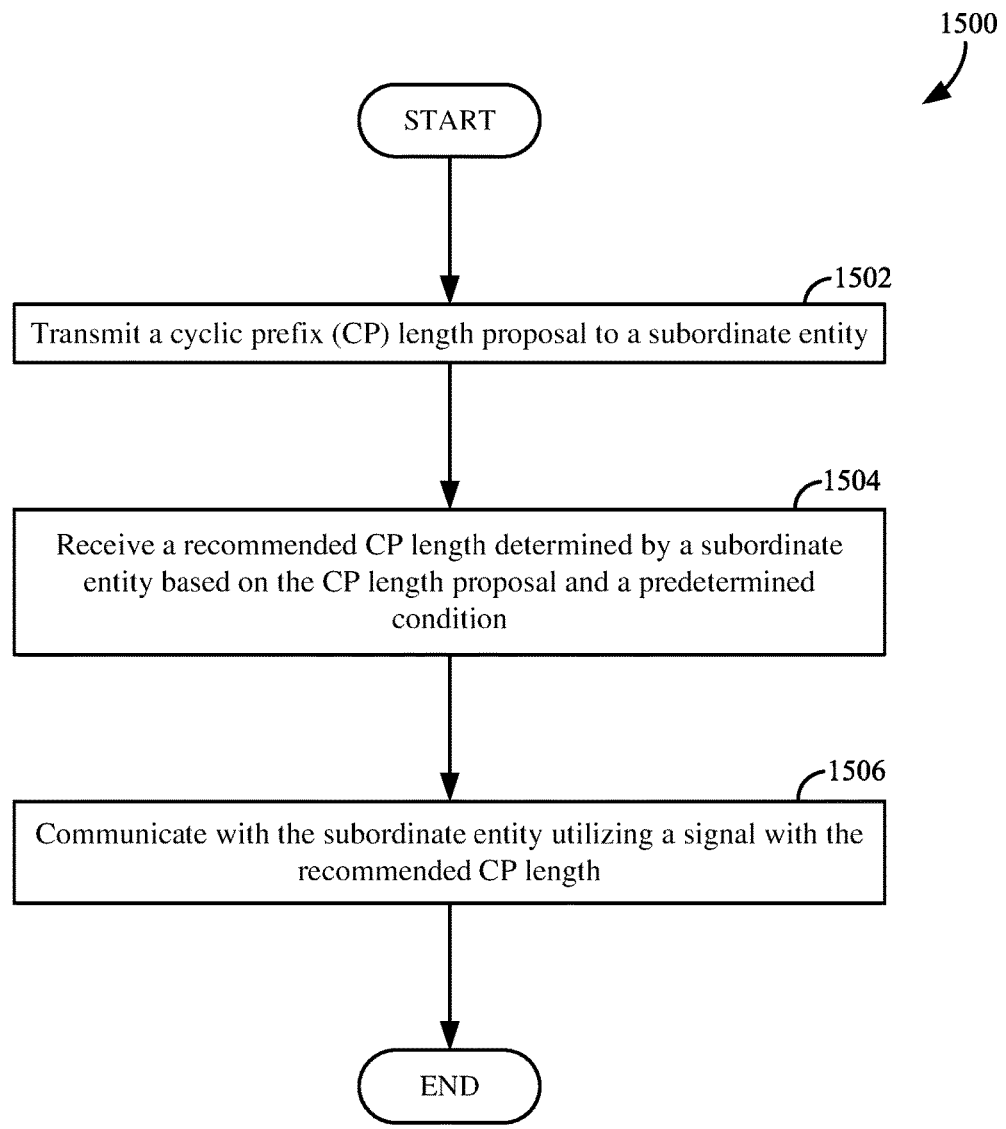
FIG. 15 is a diagram illustrating an example of determining a CP length at a scheduling entity according to some aspects of the present disclosure.

FIG. 15 is a diagram 1500 illustrating an example of various methods and/or processes for determining a CP length during wireless communication according to some aspects of the present disclosure. In some configurations, such methods and/or processes may be performed and/or implemented in the scheduling entity 202 and/or any one or more of the various apparatuses described in greater detail herein.

At block 1502, the scheduling entity may transmit a CP length proposal to a subordinate entity 204. In some examples, the scheduling entity may utilize a CP length selection block 340 (FIG. 3) to transmit the CP length proposal to the subordinate entity 204, a UE, and/or other suitable network entity. In some aspects of the disclosure, the CP length proposal may include a plurality of CP lengths (e.g., two or more CP lengths) that may be used with a signal to communicate with the subordinate entity. The CP length proposal may be a dynamic indication in the sense that the scheduling entity may provide different CP length proposal in different conditions and time intervals. For example, the CP length proposal may be controlled or updated per TTI, UE, transmission, cell, symbol, or other criteria.

The scheduling entity may determine the CP length proposal (e.g., a plurality of CP lengths) based on, for example, at least one of a modulation and coding scheme (MCS), a subcarrier spacing, a service type, a communication link direction, a rank number, a type or a capability of the subordinate entity, or a number of subordinate entities scheduled in a same TTI.

At block 1504, the scheduling entity may utilize a CP length recommendation block 342 to receive a recommended CP length determined by the subordinate entity based on the CP length proposal and a predetermined condition as described above in relation to FIGS. 8-14. In some examples, the scheduling entity may receive a recommended CP length that is different from those included in the CP length proposal. In some aspects of the disclosure, the scheduling entity may transmit a restricted set of CP lengths (e.g., included in the CP length proposal) that includes a subset of CP lengths that the scheduling entity may utilize to communicate with subordinate entities in a cell or network. The scheduling entity may send different sets of CP lengths (or CP length proposals) to different subordinate entities. At block 1506, the scheduling entity may utilize the transceiver 310 to communicate with the subordinate entity utilizing a signal with the recommended CP length. For example, the signal may be downlink data, uplink data, sidelink data, and/or other communication signals.

Several aspects of a wireless communication network have been presented with reference to an exemplary implementation. As those skilled in the art will readily appreciate, various aspects described throughout this disclosure may be extended to other telecommunication systems, network architectures and communication standards. By way of example, various aspects may be implemented within other systems defined by 3GPP, such as LTE, the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication by a node, the method comprising:
   receiving a dynamic indication configured to recommend at least one of cyclic prefix (CP) length or tone spacing from a scheduling entity;
   determining at least one of a CP length or a tone spacing for a signal for a communication link based on the dynamic indication; and
   communicating the signal utilizing the determined at least one of the CP length or the tone spacing, with the scheduling entity via the communication link.

2. The method of claim 1,
   wherein the communication link comprises at least one of a downlink, an uplink, or a sidelink, and
   wherein the determining comprises:
      determining a first CP length or a first tone spacing for one of the downlink, the uplink or the sidelink; and
      determining a second CP length that is different from the first CP length or a second tone spacing that is different from the first tone spacing, for another one of the downlink, the uplink or the sidelink.

3. The method of claim 1, further comprising:
   determining a plurality of CP lengths based on the dynamic indication, wherein the plurality of CP lengths are different from a plurality of CP lengths recommended by the scheduling entity for another node.

4. The method of claim 1, further comprising:
   configuring the signal with the CP length by radio resource control (RRC) messages.

5. The method of claim 1, further comprising:
configuring the signal with the CP length utilizing cell-specific signaling that is the same as cell-specific signaling used to configure a CP length for another node.

6. The method of claim 1, wherein the determining the CP length is further based on at least one of a modulation and coding scheme (MCS), a subcarrier spacing, a service type, a communication link direction, a rank number, a type or a capability of the node, or a number of nodes scheduled in a same transmission time interval (TTI).

7. The method of claim 1,
wherein the dynamic indication comprises one set of a plurality of sets of CP lengths utilized by the scheduling entity, and
wherein each of the sets of CP lengths is associated with at least one of a modulation and coding scheme (MCS), a subcarrier spacing, a service type, a communication link direction, a rank number, a type or a capability of the node, or a number of nodes scheduled in a same transmit time interval (TTI).

8. The method of claim 1, further comprising communicating the signal over a transmission time interval (TTI) comprising a plurality of symbols, wherein the determining the CP length comprises:
determining a first CP length for a first symbol of the plurality of symbols in the TTI; and
determining a second CP length, different from the first CP length, for a second symbol of the plurality of symbols in the TTI.

9. The method of claim 1, further comprising communicating the signal on a data channel, wherein the determining the CP length comprises:
determining a CP length for a control channel associated with the data channel, wherein the determining the CP length for the control channel is based on at least one of a semi-static indication, a static indication, or a hardcoded value.

10. The method of claim 9, wherein the control channel and the data channel are time-division multiplexed.

11. The method of claim 1, further comprising:
reporting, to the scheduling entity, a recommendation for one or more CP lengths.

12. The method of claim 1, further comprising:
receiving, from the scheduling entity, information comprising a subset of a plurality of CP lengths utilized by the scheduling entity; and
reporting, to the scheduling entity, one or more CP lengths based on the subset.

13. The method of claim 1, wherein the determining the tone spacing is further based on at least one of a modulation and coding scheme (MCS), a subcarrier spacing, a service type, a communication link direction, a rank number, a type or a capability of the node, or a number of nodes scheduled in a same transmit time interval (TTI).

14. The method of claim 1, further comprising:
reporting, to the scheduling entity, a recommendation of one or more tone spacings.

15. The method of claim 1, further comprising:
receiving, from the scheduling entity, information comprising a subset of a plurality of tone spacings utilized by the scheduling entity; and
reporting, to the scheduling entity, one or more tone spacings based on the subset.

16. An apparatus for wireless communication comprising:
a communication interface configured to utilize a signal for a communication link;
a memory stored with executable code; and
a processor operatively coupled to the communication interface and memory,
wherein the processor is configured by the executable code to:
receive a dynamic indication configured to recommend at least one of cyclic prefix (CP) length or tone spacing from a scheduling entity;
determine at least one of a CP length or a tone spacing for a signal for a communication link based on the dynamic indication; and
communicate the signal utilizing the determined at least one of the CP length or the tone spacing, with the scheduling entity via the communication link.

17. The apparatus of claim 16,
wherein the communication link comprises at least one of a downlink, an uplink, or a sidelink, and
wherein the processor is further configured to:
determine a first CP length or a first tone spacing for one of the downlink, the uplink or the sidelink; and
determine a second CP length that is different from the first CP length or a second tone spacing that is different from the first tone spacing, for another one of the downlink, the uplink or the sidelink.

18. The apparatus of claim 16, wherein the processor is further configured to:
determine a plurality of CP lengths based on the dynamic indication, wherein the plurality of CP lengths are different from a plurality of CP lengths recommended by the scheduling entity for another node.

19. The apparatus of claim 16, wherein the processor is further configured to:
configure the signal with the CP length by radio resource control (RRC) messages.

20. The apparatus of claim 16, wherein the processor is further configured to:
configure the signal with the CP length utilizing cell-specific signaling that is the same as cell-specific signaling used to configure a CP length for another node.

21. The apparatus of claim 16, wherein the processor is further configured to determine the CP length further based on at least one of a modulation and coding scheme (MCS), a subcarrier spacing, a service type, a communication link direction, a rank number, a type or a capability of the apparatus, or a number of nodes scheduled in a same transmission time interval (TTI).

22. The apparatus of claim 16,
wherein the dynamic indication comprises one set of a plurality of sets of CP lengths utilized by the scheduling entity, and
wherein each of the sets of CP lengths is associated with at least one of a modulation and coding scheme (MCS), a subcarrier spacing, a service type, a communication link direction, a rank number, a type or a capability of the apparatus, or a number of nodes scheduled in a same transmit time interval (TTI).

23. The apparatus of claim 16, wherein the processor is further configured to:
communicate the signal over a transmission time interval (TTI) comprising a plurality of symbols;
determine a first CP length for a first symbol of the plurality of symbols in the TTI; and
determine a second CP length, different from the first CP length, for a second symbol of the plurality of symbols in the TTI.

24. The apparatus of claim 16, wherein the processor is further configured to:
  communicate the signal on a data channel; and
  determine a CP length for a control channel associated with the data channel, based on at least one of a semi-static indication, a static indication, or a hard-coded value.

25. The apparatus of claim 24, wherein the control channel and the data channel are time-division multiplexed.

26. The apparatus of claim 16, wherein the processor is further configured to:
  report, to the scheduling entity, a recommendation for one or more CP lengths.

27. The apparatus of claim 16, wherein the processor is further configured to:
  receive information comprising a subset of a plurality of CP lengths utilized by the scheduling entity; and
  report, to the scheduling entity, one or more CP lengths based on the subset.

28. The apparatus of claim 16, wherein the processor is further configured to determine the tone spacing further based on at least one of a modulation and coding scheme (MCS), a subcarrier spacing, a service type, a communication link direction, a rank number, a type or a capability of the apparatus, or a number of nodes scheduled in a same transmit time interval (TTI).

29. The apparatus of claim 16, wherein the processor is further configured to:
  report, to the scheduling entity, a recommendation of one or more tone spacings.

30. The apparatus of claim 16, wherein the processor is further configured to:
  receive information comprising a subset of a plurality of tone spacings utilized by the scheduling entity; and
  report, to the scheduling entity, one or more tone spacings based on the subset.

* * * * *